(12) United States Patent
Damnjanovic et al.

(10) Patent No.: US 11,622,394 B2
(45) Date of Patent: Apr. 4, 2023

(54) VIRTUAL MULTIPLE-INPUT MULTIPLE-OUTPUT USING RELAYS

(71) Applicant: QUALCOMM Incorporated, San Diego, CA (US)

(72) Inventors: Aleksandar Damnjanovic, Del Mar, CA (US); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 16/942,686

(22) Filed: Jul. 29, 2020

(65) Prior Publication Data

US 2021/0084697 A1 Mar. 18, 2021

Related U.S. Application Data

(60) Provisional application No. 62/899,666, filed on Sep. 12, 2019.

(51) Int. Cl.
| | |
|---|---|
| *H04W 76/11* | (2018.01) |
| *H04W 16/14* | (2009.01) |
| *H04W 80/02* | (2009.01) |
| *H04W 88/08* | (2009.01) |
| *H04W 72/20* | (2023.01) |

(52) U.S. Cl.
CPC ............ *H04W 76/11* (2018.02); *H04W 16/14* (2013.01); *H04W 72/20* (2023.01); *H04W 80/02* (2013.01); *H04W 88/085* (2013.01)

(58) Field of Classification Search
CPC ..... H04B 7/026; H04B 7/2606; H04W 76/11; H04L 5/0035
See application file for complete search history.

(56) References Cited

U.S. PATENT DOCUMENTS

2009/0175214 A1  7/2009  Sfar et al.
2018/0084539 A1* 3/2018  Kubota ................ H04W 76/20

OTHER PUBLICATIONS

International Search Report and Written Opinion—PCT/US2020/044323—ISA/EPO—dated Nov. 10, 2020.

* cited by examiner

*Primary Examiner* — Hoon J Chung
(74) *Attorney, Agent, or Firm* — Arent Fox, LLP/QUALCOMM

(57) ABSTRACT

A UE may establish a communications link with a base station. The UE may determine at least two radio network temporary identifiers (RNTIs) associated with the communications link, wherein each of the at least two RNTIs is associated with a respective relay device of a plurality of relay devices. The UE may receive, from a first relay device of the plurality of relay devices, at least one first stream associated with a first RNTI of the at least two RNTIs, wherein the at least one first stream carries data or control information associated with the communications link. The UE may receive, from a second relay device of the plurality of relay devices, at least one second stream associated with a second RNTI of the at least two RNTIs, wherein the at least one second stream carries data or control information associated with the communications link.

29 Claims, 11 Drawing Sheets

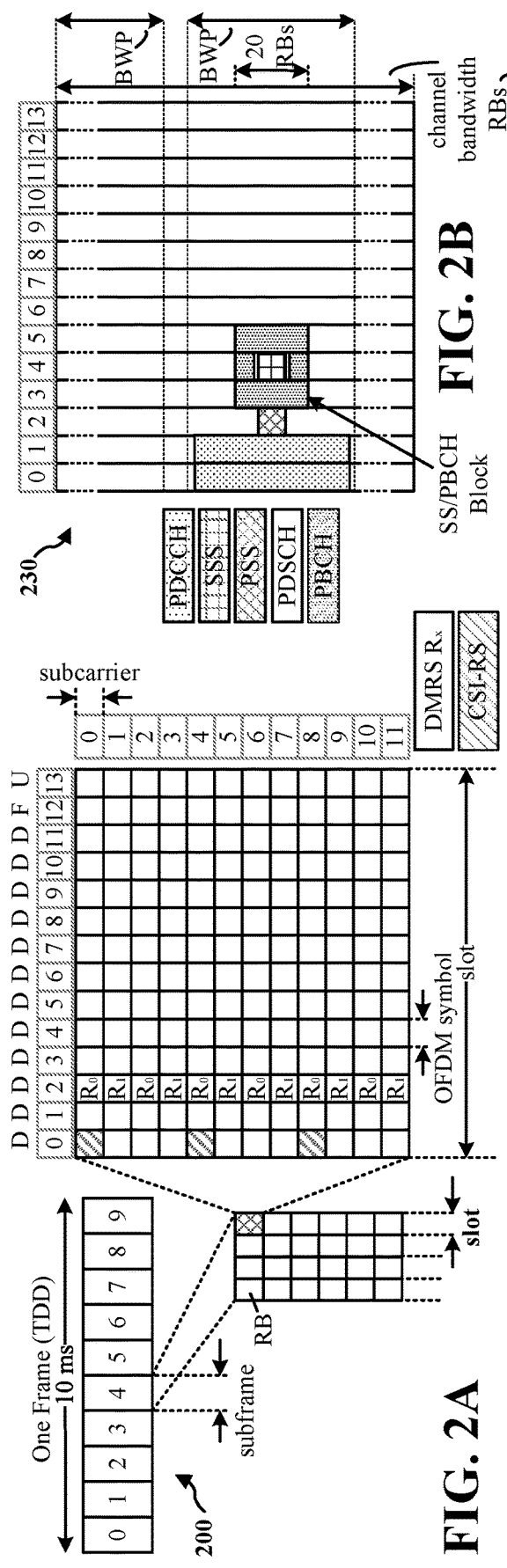
FIG. 2A
FIG. 2B
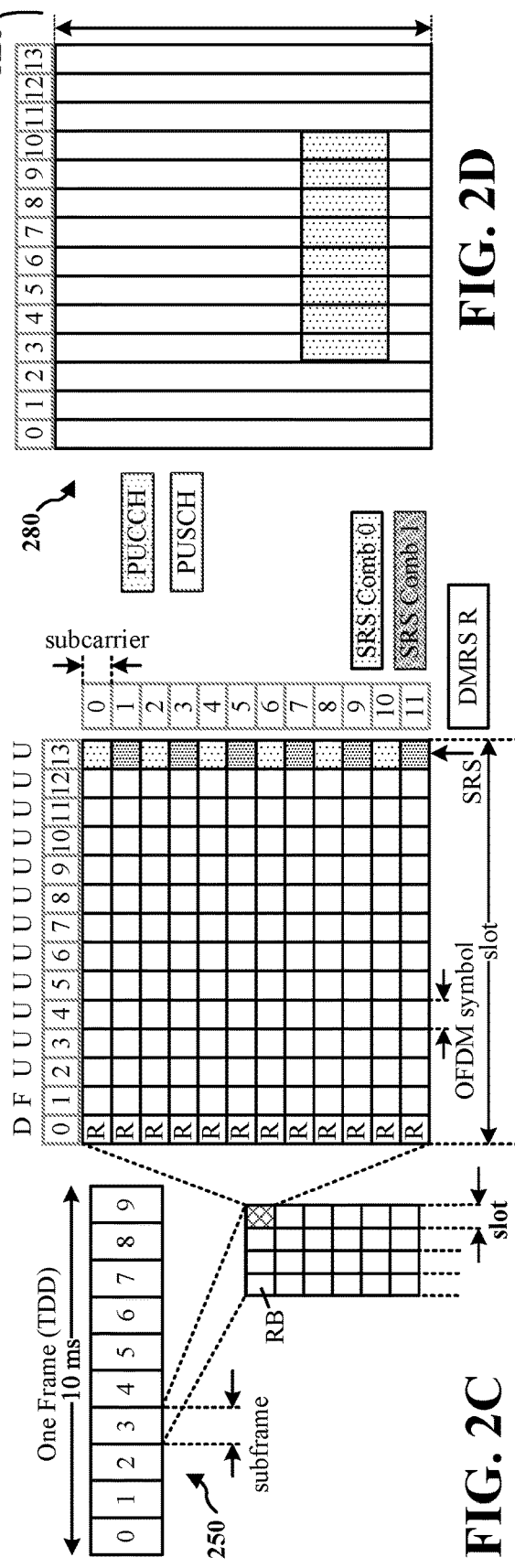
FIG. 2C
FIG. 2D

VIRTUAL MULTIPLE-INPUT MULTIPLE-OUTPUT USING RELAYS

CROSS REFERENCE TO RELATED APPLICATION(S)

This application claims the benefit of U.S. Provisional Application Ser. No. 62/899,666, entitled "VIRTUAL MULTIPLE-INPUT MULTIPLE-OUTPUT USING RELAYS" and filed on Sep. 12, 2019, the disclosure of which is expressly incorporated by reference herein in its entirety.

BACKGROUND

Technical Field

The present disclosure generally relates to communication systems, and more particularly, to a user equipment configured for virtual multiple-input multiple-output using a plurality of relay devices connected with a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example access network, an available bandwidth may be partitioned into a set of ranges, which may be non-contiguous. In 5G NR, for example, the available system bandwidth may be separated into frequency range 1 (FR1) and frequency range 2 (FR2), with FR1 being relatively lower than FR2. Specifically, FR1 may include a sub-6 gigahertz (GHz) spectrum, whereas FR2 may include a millimeter wave (mmW) and/or near-mmW spectrum. In implementation, FR1 may include approximately 410 megahertz (MHz) to 7125 MHz (even though FR1 may be referred to as "sub-6 GHz"), and FR2 may include approximately 24.25 GHz to 52.6 GHz.

Comparatively, FR2 may offer increased speeds and throughput relative to FR1; however, FR1 may offer greater reliability and increased coverage relative to FR2. User equipment (UE) may be configured to communicate in both FR1 and FR2, but the form factor (e.g., size, shape, layout, component positioning, etc.) of a UE may limit the antenna configuration of the UE (e.g., a number of antenna elements and/or a number of antenna modules that can be included in a UE within a designated form factor). Due to the limited antenna configuration of a UE, a base station-to-UE link may not fully exploit the potential capabilities of the UE, such as the baseband capabilities of the UE to communicate in FR2 as an alternative or addition to FR1.

In view of the foregoing, UEs may benefit from techniques and approaches to increase the utilization of the baseband capabilities. For example, a communications link between a UE and a base station, which may have otherwise been implemented in FR1, may be implemented in FR2 in order to increase throughput capacity as well as reduce latency.

To do so, the limiting factor (i.e., the antenna configuration) of a UE may be addressed through introduction of relay devices to the base station-to-UE communications link. Relay devices may relay streams (e.g., a stream carrying data and/or control information) between the base station and the UE, while maintaining the base station-to-UE communications link. A UE may connect with a plurality of relay devices for a single communications link with a base station. The UE may "share" or "borrow" the antenna elements of each of the plurality of relay devices such that each of the plurality of relay devices may contemporaneously (or even simultaneously) relay a respective portion of data and/or control information in FR2 with the UE for a single base station-to-UE communications link but may relay each respective portion of the data and/or control information in FR1 with the base station for the same base station-to-UE communications link. The "sharing" or "borrowing" of relay device antenna elements by the UE may be dynamic and/or transparent to the network (e.g., the base station may be agnostic to this arrangement). The UE, therefore, may increase utilization of baseband capabilities through virtual multiple-input multiple-output (MIMO) on a single base station-to-UE communications link using a plurality of relay devices.

Thus, as described herein, a plurality of relay devices may be inserted in the base station-to-UE communications link; however, each of the relay devices may communicate with the base station in FR1 but may communicate with the UE in FR2. In this way, a base station-to-UE communications link may benefit from both the increased coverage and greater reliability offered by FR1 and the higher throughput and increased speeds offered by FR2. The present disclosure may describe various methods, computer-readable media, and apparatuses to achieve virtual MIMO using relay devices.

In an aspect of the disclosure, a method, a computer-readable medium, and an apparatus are provided. The apparatus may be a UE. The UE may establish a communications link with a base station. The UE may determine at least two radio network temporary identifiers (RNTIs) associated with the communications link, wherein each of the at least two RNTIs is associated with a respective relay device of a plurality of relay devices. The UE may receive, from a first relay device of the plurality of relay devices, at least one first stream associated with a first RNTI of the at least two RNTIs, wherein the at least one first stream carries data or control information associated with the communications link. The UE may receive, from a second relay device of the plurality of relay devices, at least one second stream associated with a second RNTI of the at least two RNTIs, wherein the at least one second stream carries data or control information associated with the communications link.

In another aspect of the disclosure, another method, another computer-readable medium, and another apparatus are provided. The other apparatus may be a base station. The base station may establish a communications link with a UE. The base station may determine at least two RNTIs associated with the UE, wherein each of the at least two RNTIs is associated with a respective relay device of a plurality of relay devices. The base station may transmit, to a first relay device of the plurality of relay devices, at least one first stream associated with a first RNTI of the at least two RNTIs, wherein the at least one first stream carries data or control information associated with the communications link. The base station may transmit, to a second relay device of the plurality of relay devices, at least one second stream associated with a second RNTI of the at least two RNTIs, wherein the at least one second stream carries data or control information associated with the communications link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
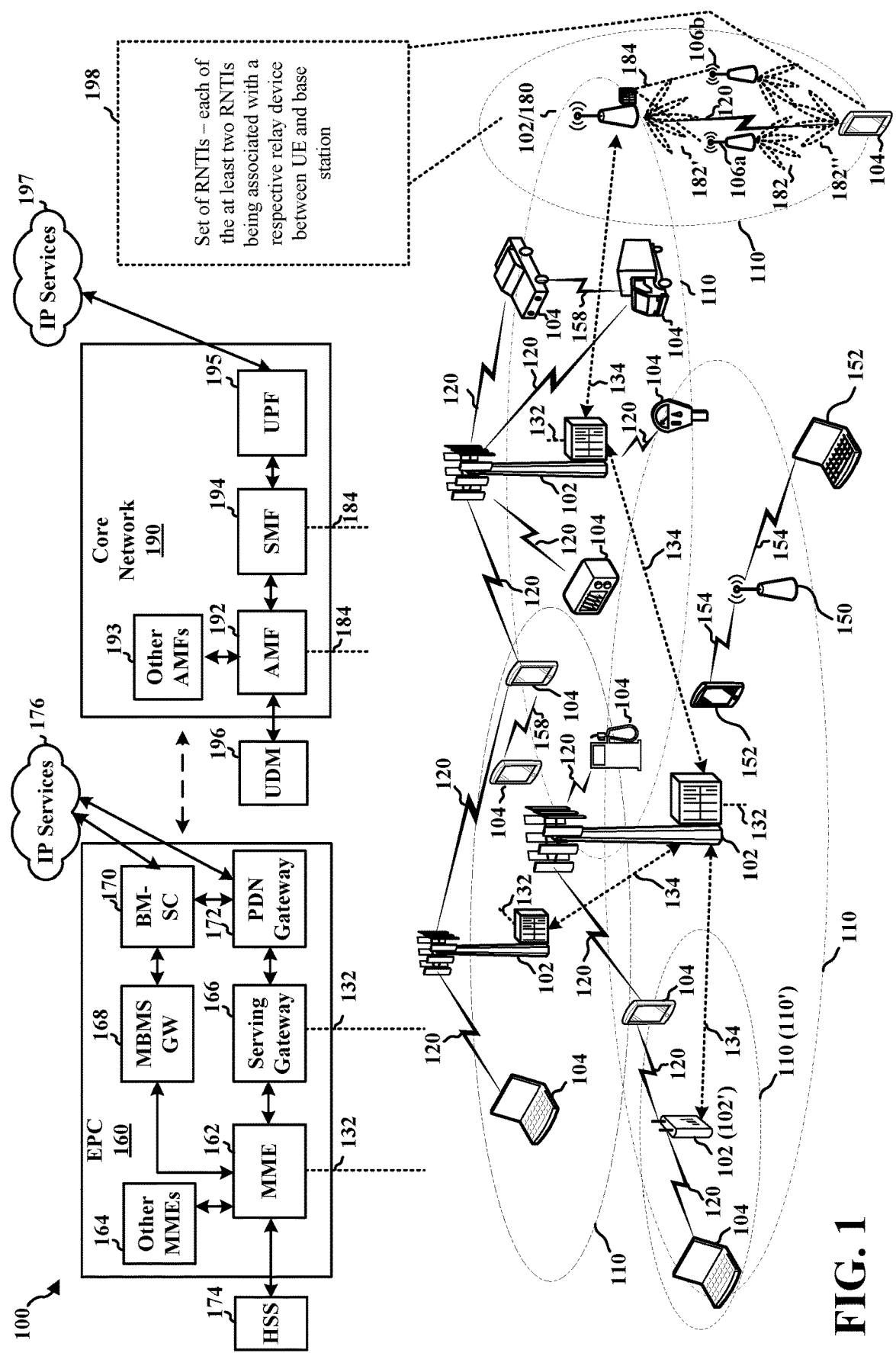
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 and the base station 102/180 may be configured to establish a communications link 120. The communications link 120 may include, for example, a bearer through the base station 102/180 to the UE 104. When first establishing the communications link 120 between the base station 102/180 and the UE 104, the base station 102/180 and the UE 104 may directly communicate, although the direct communication may be in a sub-6 and/or sub-7 GHz spectrum, such as FR1 of 5G NR spanning approximately 410 MHz to 7125 MHz.

The UE 104, however, may be further capable of mmW communication, which may include communication in FR2 of 5G NR spanning approximately 24.25 GHz to 52.6 GHz. In order to exploit the mmW communication capabilities of the UE 104, the communications link 120 between the base station 102/180 and the UE 104 may be divided into two portions: a first portion of the communications link 120 may be implemented between the base station 102/180 and a set of relay devices 106a-b, whereas a second portion of the communications link 120 may be implemented between the set of relay devices 106a-b and the UE 104. Each of the set of relay devices 106a-b may be a fixed node and/or a mobile node, for example, including a remote radio head (RRH), a mobile station, a UE, and the like.

By separating the communications link 120, the UE 104 may "share" the antennas of each of the set of relay devices 106*a-b* for mmW communication (e.g., communication in FR2) in order to communicate each of a set of streams through each of the set of relay devices 106*a-b* that carry data and/or control information associated with the communications link 120.

In some aspects, each of the set of relay devices 106*a-b* may communicate with the base station 102/180 in a sub-6 or sub-7 GHz spectrum (e.g., FR1, a backhaul link, etc.). Each of the set of relay devices 106*a-b* may communicate, with the base station 102/180, each of a set of streams that carry the data and/or control information associated with the communications link 120.

In order to communicate with each of the set of relay devices 106*a-b*, a radio network temporary identifier (RNTI) may be respectively assigned thereto. The UE 104 may request the set of RNTIs 198 from the base station 102/180. Based on the request, the base station 102/180 may determine each RNTI of the set of RNTIs 198 and may transmit the set of RNTIs 198 to the UE 104 (e.g., directly on the communications link 120, in a sub-6 or sub-7 GHz band, in FR2). When the UE 104 receives the set of RNTIs 198 from the base station 102/180, the UE 104 may respectively assign each of the set of RNTIs 198 to each of the set of relay devices 106*a-b* and may transmit a respectively assigned RNTI to each of the set of relay devices 106*a-b*.

The set of RNTIs 198 may enable the data and/or control information on the communications link 120 to be separated into a set of streams, and each of the set of streams may correspond to one of the set of relay devices 106*a-b* and the respectively assigned RNTI. The base station 102/180 may transmit data and/or control information associated with the communications link 120 on the streams to the set of relay devices 106*a-b* according to the respectively assigned RNTIs. The transmission streams between the base station 102/180 and the set of relay devices 106*a-b* may be in a sub-6 or sub-7 GHz network, in FR1, and/or via a backhaul link 184.

The set of relay devices 106*a-b* may then relay the data and/or control information associated with the communications link 120 on streams to the UE 104 according to the respectively assigned RNTIs. The set of relay devices 106*a-b* may transmit the streams carrying the data and/or control information associated with the communications link 120 in a mmW and/or near-mmW network (e.g., FR2) and/or in an unlicensed network (e.g., a sub-6 or sub-7 GHz unlicensed network and/or a mmW unlicensed network).

The UE 104 may receive the streams from the set of relay devices 106*a-b* according to the respectively assigned RNTIs, and the UE 104 may aggregate the streams so that the data and/or control information associated with the communications link 120 is passed to the higher layers of the UE 104 as a single stream. In other words, the separation of the communications link 120 through the set of relay devices 106*a-b* may be transparent to the higher layers of the UE 104.

In the uplink, the UE 104 may follow a similar procedure. Specifically, the UE 104 may transmit data and/or control information associated with the communications link 120 on streams to the set of relay devices 106*a-b* according to the respectively assigned RNTIs. The UE 104 may transmit the data and/or control information associated with the communications link 120 in a mmW and/or near-mmW network (e.g., FR2) and/or in an unlicensed network (e.g., a sub-6 or sub-7 GHz unlicensed network and/or a mmW unlicensed network).

The set of relay devices 106*a-b* may receive the streams carrying the data and/or control information associated with the communications link 120 according to the respectively assigned RNTIs, and the set of relay devices 106*a-b* may relay the data and/or control information associated with the communications link 120 on streams to the base station 102/180. The set of relays 106*a-b* may transmit the streams carrying the data and/or control information associated with the communications link 120 in a sub-6 or sub-7 network (e.g., FR1, via backhaul link 184).

The base station 102/180 may receive the streams carrying the data and/or control information associated with the communications link 120 from the set of relays 106*a-b* according to the respectively assigned RNTIs. The base station 102/180 may aggregate the streams carrying the data and/or control information associated with the communications link 120 so that the data and/or control information is passed to the higher layers of the base station 102/180 as a single stream.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
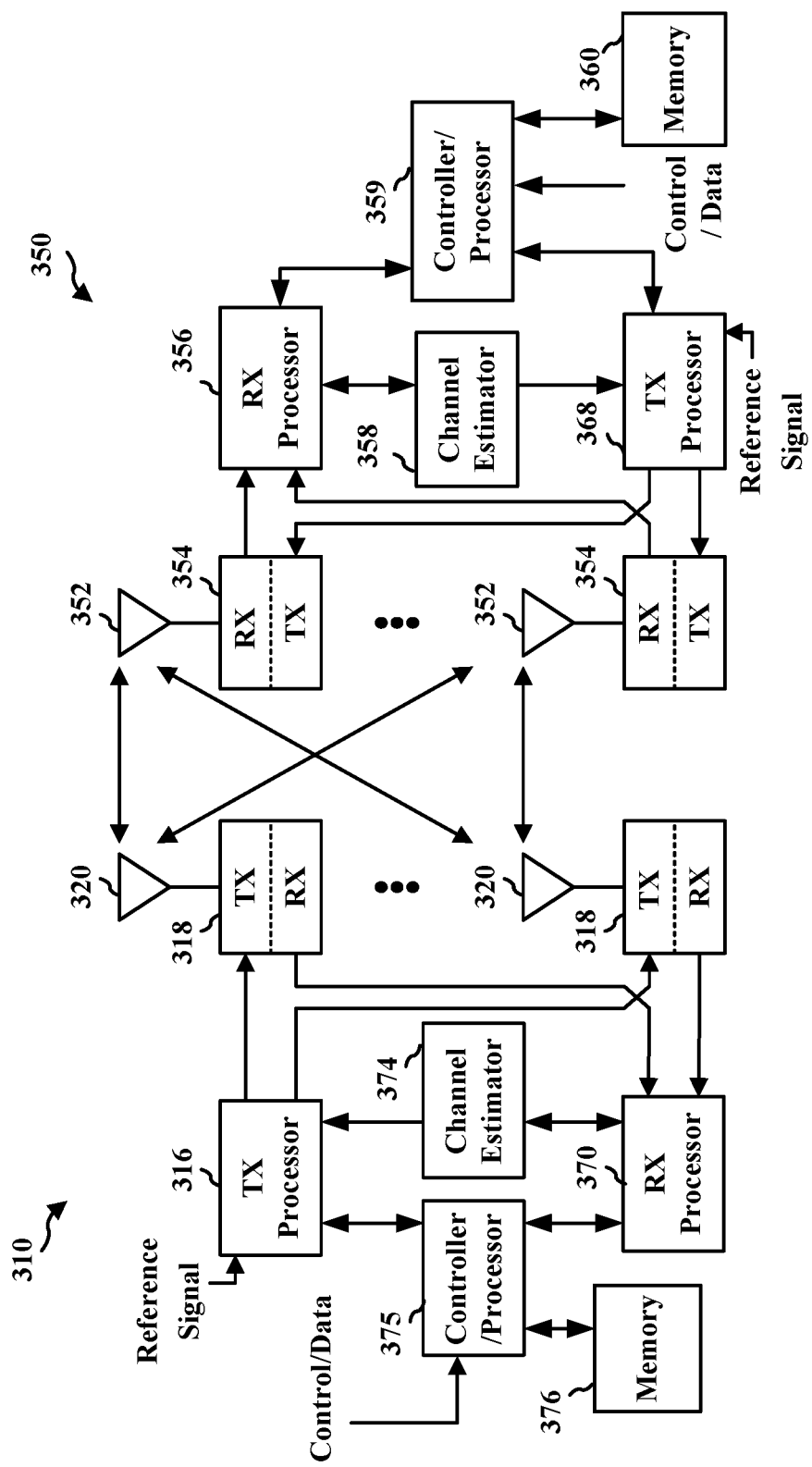
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the set of RNTIs 198 of FIG. 1.

In some other aspects, at least one of the TX processor 316, the RX processor 370, and the controller/processor 375 may be configured to perform aspects in connection with the set of RNTIs 198 of FIG. 1.

Figure 4:
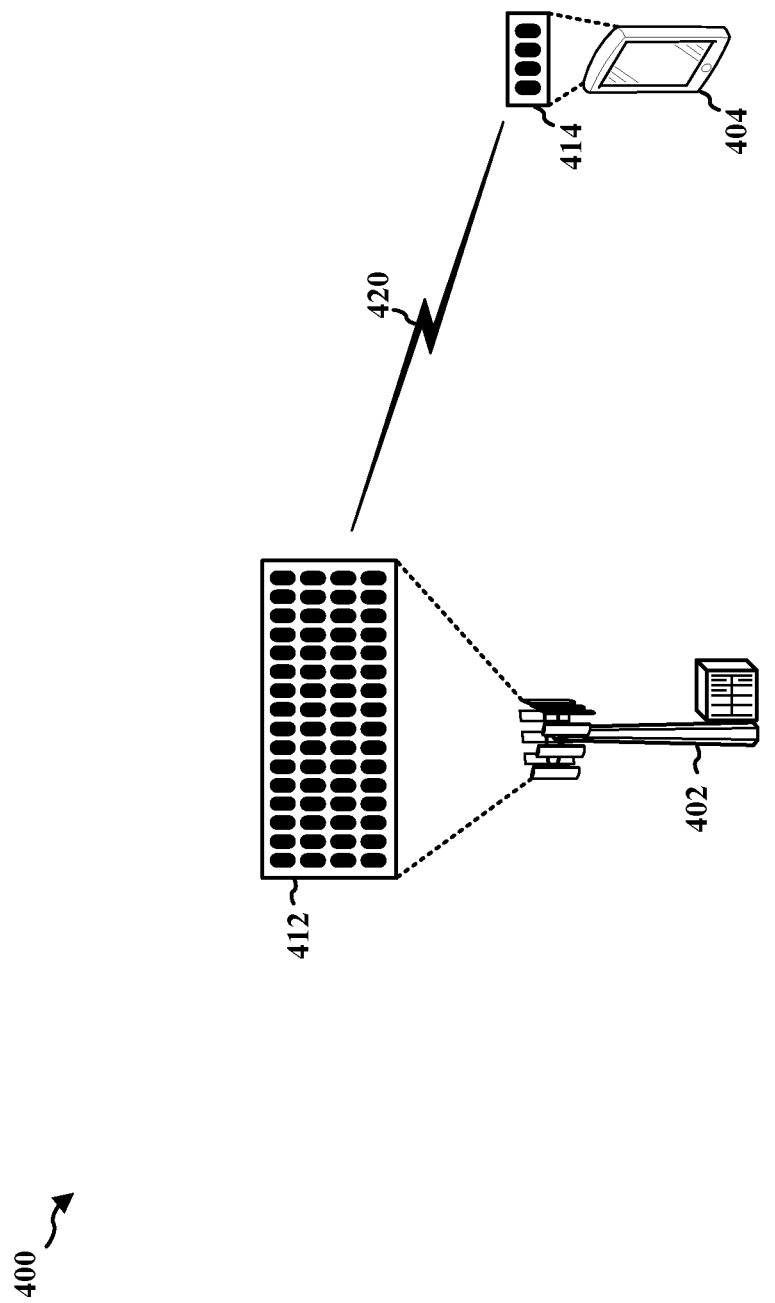
FIG. 4 is a diagram illustrating an example of a wireless communications system.

Referring to FIG. 4, a block diagram illustrating an example access network 400. The access network 400 may include, inter alia, a base station 402 and a UE 404. The base station 402 and the UE 404 may be configured to communicate in a RAN configured according to a RAT, such as 5G NR. According to the RAT, communication in the RAN may be separated into at least two bands, a first of which may be a relatively lower frequency band (e.g., a sub-6 or sub-7 GHz band) and a second of which may be a different (e.g., relatively higher) frequency band, such as a mmW band, a near-mmW band, and/or an unlicensed band (e.g., a sub-6 or sub-7 GHz unlicensed band and/or a mmW unlicensed band). For example, the access network 400 may implement the 5G NR RAT. The present disclosure may describe various aspects in the context of a 5G NR RAT; however, the various aspects of the present disclosure may be applicable to various other RATs and/or wireless networks (e.g., a Wi-Fi network).

The 5G NR RAN, for example, may be separated into FR1 and FR2. FR1 may include a sub-6 GHz or sub-7 GHz spectrum, whereas FR2 may include a mmW and/or near-mmW spectrum. In implementation, FR1 may include approximately 410 MHz to 7125 MHz (even though FR1 may be referred to as "sub-6 GHz"), and FR2 may include approximately 24.25 GHz to 52.6 GHz. Comparatively, FR2 may offer increased speeds and throughput relative to FR1; however, FR1 may offer greater reliability and increased coverage relative to FR2.

The base station 402 and the UE 404 may be configured to communicate in both FR1 and FR2 in the access network 400. In particular, the base station 402 may include a relatively large number of antenna elements 412. For example, the base station 402 may include 64 antenna elements 412. Thus, the base station 402 may be capable of transmitting a relatively large number of streams in FR2, which may improve reliability and/or coverage.

The UE 404, however, may be unable to directly communicate with the base station 402 in FR2. For example, the form factor (e.g., size, shape, layout, component positioning, etc.) of the UE 404 may limit the configuration of the antenna elements 414 of the UE 404 (e.g., a number of antenna elements 414 and/or a number of antenna modules that can be included in a UE 404 within a designated form factor). In addition, the UE 404 may only activate a single radio frequency (RF) chain to control the antenna elements 414 in FR1 and, therefore, may only be capable of receiving one stream or layer, or potentially two streams or layers due to antenna polarization.

Due to this limited antenna configuration of the UE 404, the base station-to-UE link 420 may not fully exploit the potential capabilities of the UE 404, such as the baseband capabilities of the UE 404 to communicate in FR2 as an alternative or addition to FR1. Thus, the base station 402 and the UE 404 may establish a link 420 in FR1, for example, because the distance between the UE 404 and the base station 402 is too great for direct communication in FR2 and/or FR2 may not offer the reliability (e.g., QoS) expected by the base station 402 and/or the UE 404 on the link 420. Thus, the link 420 between the base station 402 and the UE 404 may be in FR1, for example, so that the base station 402 may cover the UE 404 while also delivering the reliability expected on the link 420 (e.g., when the base station 402 and the UE 404 directly communicate on the link 420).

In view of the foregoing, UEs may benefit from techniques and approaches to increase the utilization of the baseband capabilities. For example, a communications link between a UE and a base station, which may have otherwise been implemented in FR1, may be implemented in FR2 in order to increase throughput capacity as well as reduce latency.

As described in the context of FIGS. 5-11, a UE may be configured for virtual MIMO in FR2 by addressing the limiting factor (i.e., the antenna configuration) of the UE through introduction of relay devices to the base station-to-UE communications link. Relay devices may relay streams (e.g., a stream carrying data and/or control information) between the base station and the UE, while maintaining the base station-to-UE communications link.

As further described in the context of FIGS. 5-11, a UE may be configured with a plurality of RF chains, each of which may control a set of antenna elements (e.g., each antenna module or antenna panel). In FR2, a UE may be capable of simultaneously activating at least two RF chains and, further, controlling each of the RF chains for beamforming in a respective different direction using a respective set of antenna elements controlled by each of the RF chains. In simultaneously activating a plurality of RF chains, each controlling a set of antenna elements for a different direction, the UE may connect with a plurality of relay devices for a single communications link with a base station. The UE may "share" or "borrow" the antenna elements of each of the plurality of relay devices such that each of the plurality of relay devices may contemporaneously (or even simultaneously) relay a respective portion of data and/or control information in FR2 with the UE for a single base station-to-UE communications link but may relay each respective portion of the data and/or control information in FR1 with the base station for the same base station-to-UE communications link.

The "sharing" or "borrowing" of relay device antenna elements by the UE may be dynamic and/or transparent to the network (e.g., the base station may be agnostic to this arrangement). The UE, therefore, may increase utilization of baseband capabilities through virtual MIMO on a single base station-to-UE communications link using a plurality of relay devices.

Figure 5:
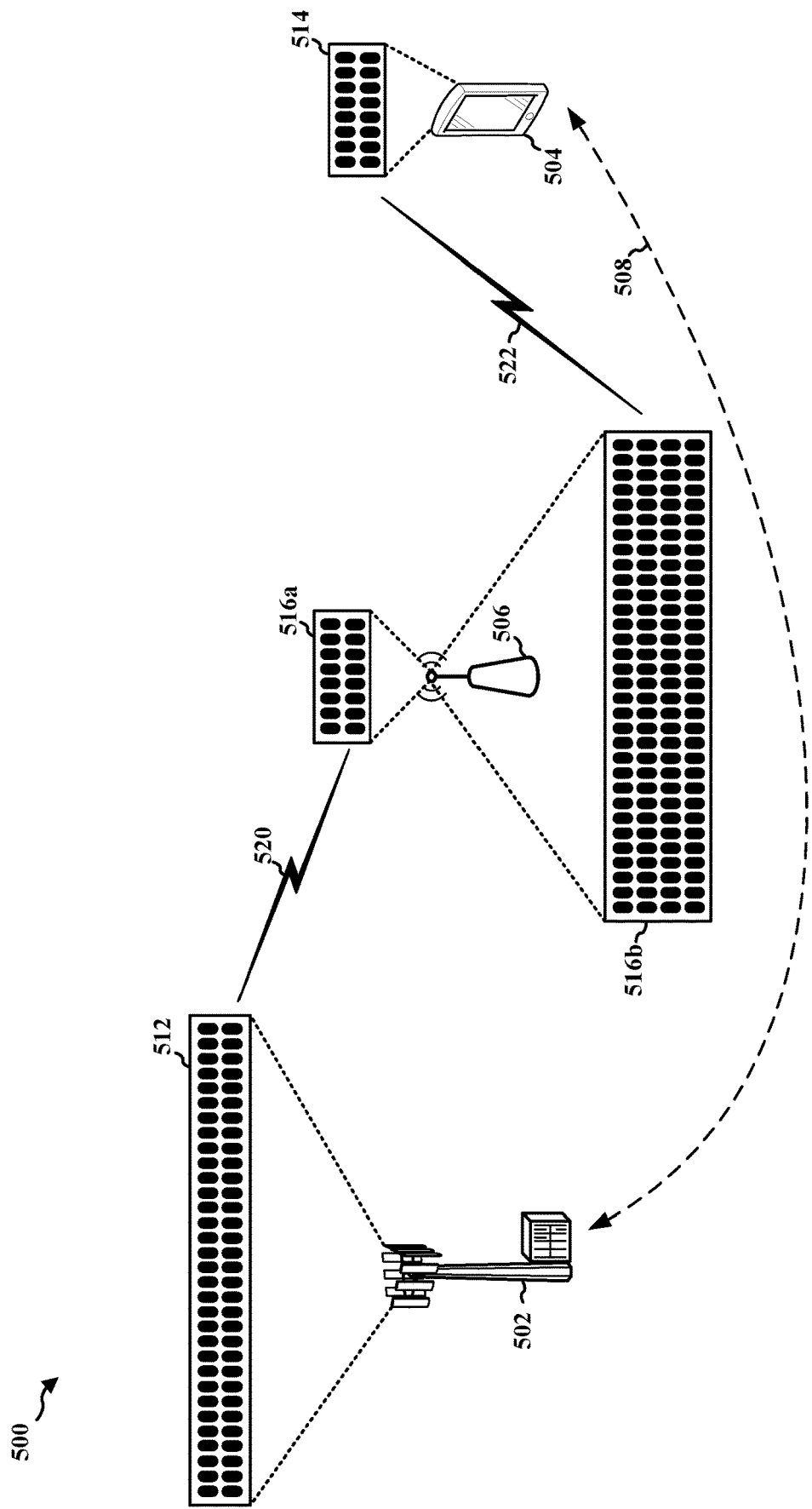
FIG. 5 is a diagram illustrating an example of a communications link through a relay device in a wireless communications system.

Turning now to FIG. 5, a diagram illustrates a wireless communication environment 500 including at least a base station 502, a UE 504, and a relay device 506. The base station 502 may be implemented, for example, as the base station 102/180, the base station 310, and/or the base station 402. The UE 504 may be implemented, for example, as the UE 104, the UE 350, and/or the UE 404. The relay device 506 may be implemented as any device capable of relaying data and/or control information between the base station 502 and the UE 504. In some aspects, the relay device 506 may be implemented as a RRH. In some other aspects, the relay device 506 may be implemented as a mobile station, a UE, a fixed node, and/or a mobile node.

In the wireless communication environment 500, the base station 502 and the UE 504 may establish a logical link 508. For example, the higher layers of the UE 504 (e.g., MAC layer, RLC layer, PDCP layer) may establish a logical link with the corresponding higher layers of the base station 502. However, one of the relay device 506 may divide the physical base station-to-UE link into two links 520, 522 while still maintaining the logical base station-to-UE link 508. The first link 520 between the base station 502 and the relay device 506 may be a backhaul link in a sub-6 or sub-7 GHz band of a RAT (e.g., FR1). Thus, the first link 520 may allow the relay device 506 to be further from the base station 502 while still providing reliability relative to a link in a higher spectrum band (e.g., FR2).

The second link 522 between the relay device 506 and the UE 504 may be an access link in a mmW and/or near-mmW band of the RAT (e.g., FR2) or may be a link in an unlicensed network (e.g., a sub-6 or sub-7 GHz unlicensed network and/or a mmW unlicensed network). Potentially, the second ink 522 may provide increased data rates and/or reduced latency relative to a link in a lower spectrum band (e.g., FR1). However, the relay device 506 may be relatively more proximate to the UE 504 than the base station 502, for example, because the second link 522 may not span a coverage area as large as that spanned by the first link 520.

Unlike the UE 504, the antenna configuration of the relay device 506 may not be limited, for example, due to the form factor of the relay device 506. For example, the relay device 506 may be relatively larger and/or may be subject to relatively fewer design constraints than the UE 504, which may allow the antenna configuration of the relay device 506 to include a greater number of antenna elements 516a, 516b than the UE 504.

As described with respect to FIG. 4, supra, a UE 404 may be limited to using fewer antenna elements (e.g., four antenna elements 414 controlled by one RF chain) than the base station 402. Thus, in the illustrated example of FIG. 4, the UE 404 may communicate in FR1 using 4 antenna elements 414 (e.g., controlled by one RF chain), whereas the base station 402 may communicate in FR1 using 64 antenna elements 412.

In contrast, the relay device 506 may be configured to communicate in FR1 using 16 antenna elements 516a. Further, the relay device 506 may be configured to communicate using up to 128 antenna elements 516b in a mmW or near-mmW band (e.g., FR2) or in an unlicensed band (e.g., a sub-6 or sub-7 GHz unlicensed band and/or a mmW unlicensed band). The UE 504 may, in effect, "borrow" or "share" the antenna elements 516*a* of the relay device 506 to increase the data rate and/or reduce the latency experienced on the logical link 508 relative to a direct link between the base station 502 and the UE 504 (e.g., because the UE 504 may use up to 4 antenna elements controlled by a single RF chain for communication in a sub-6 or sub-7 GHz band, such as FR1, whereas the relay device 506 may use up to 16 antenna elements 516*a*).

The UE 504 may be configured to use a greater number of antenna elements 514 in the mmW or near-mmW band (e.g., FR2) relative to the sub-6 or sub-7 GHz band (e.g., FR1). For example, the UE 504 may be configured to use up to 16 antenna elements 514 in the mmW or near-mmW band or unlicensed band. In various aspects, the UE 504 may be configured to activate at least two RF chains for communication in the mmW or near-mmW band (e.g., due to digital beamforming and/or hybrid beamforming) or unlicensed band to control the up to 16 antenna elements 514. Correspondingly, the relay device 506 may be configured to use up to 128 antenna elements 516*b* in the mmW or near-mmW band (e.g., FR2) or unlicensed band.

Accordingly, the base station 502 may be configured to communicate using 64 antenna elements 512 and the relay device 506 may be configured to communicate using 16 antenna elements 516*a* on the first link 520. On the second link 522, the relay device 506 may be configured to communicate using 128 antenna elements 516*b* and the UE 504 may be configured to communicate using 16 antenna elements 514. Thus, the number of streams communicated by the UE 504 may be limited by a greater number of antenna elements (e.g., 16) when the logical link 508 is divided into the first and second physical links 520, 522, relative to the number of antenna elements (e.g., 4) that limits the number of streams communicated by the UE 504 when the UE 504 physical link between the base station 502 and the UE 504 is direct.

In order to identify the UE 504, the base station 502 may determine (e.g., allocate and/or generate) an RNTI for the UE 504. For example, the base station 502 may determine a cell-RNTI (C-RNTI) for the UE 504. The base station 502 may transmit the RNTI to the UE 504 and, when received by the UE 504, the RNTI may be used to identify data and/or control information on the logical link 508. In other words, data and/or control information to be communicated on the logical link 508 may be identified as associated with the UE 504 based on the RNTI. For example, data and/or control information on the logical link 508 may be scrambled with the RNTI, an integrity and/or authenticity value (e.g., cyclic redundancy check (CRC) value or message integrity code (MIC) value) appended to the data and/or control information 640 may be scrambled with the RNTI, the data and/or control information 640 on the logical link 508 may indicate the RNTI, and so forth.

Figure 6:
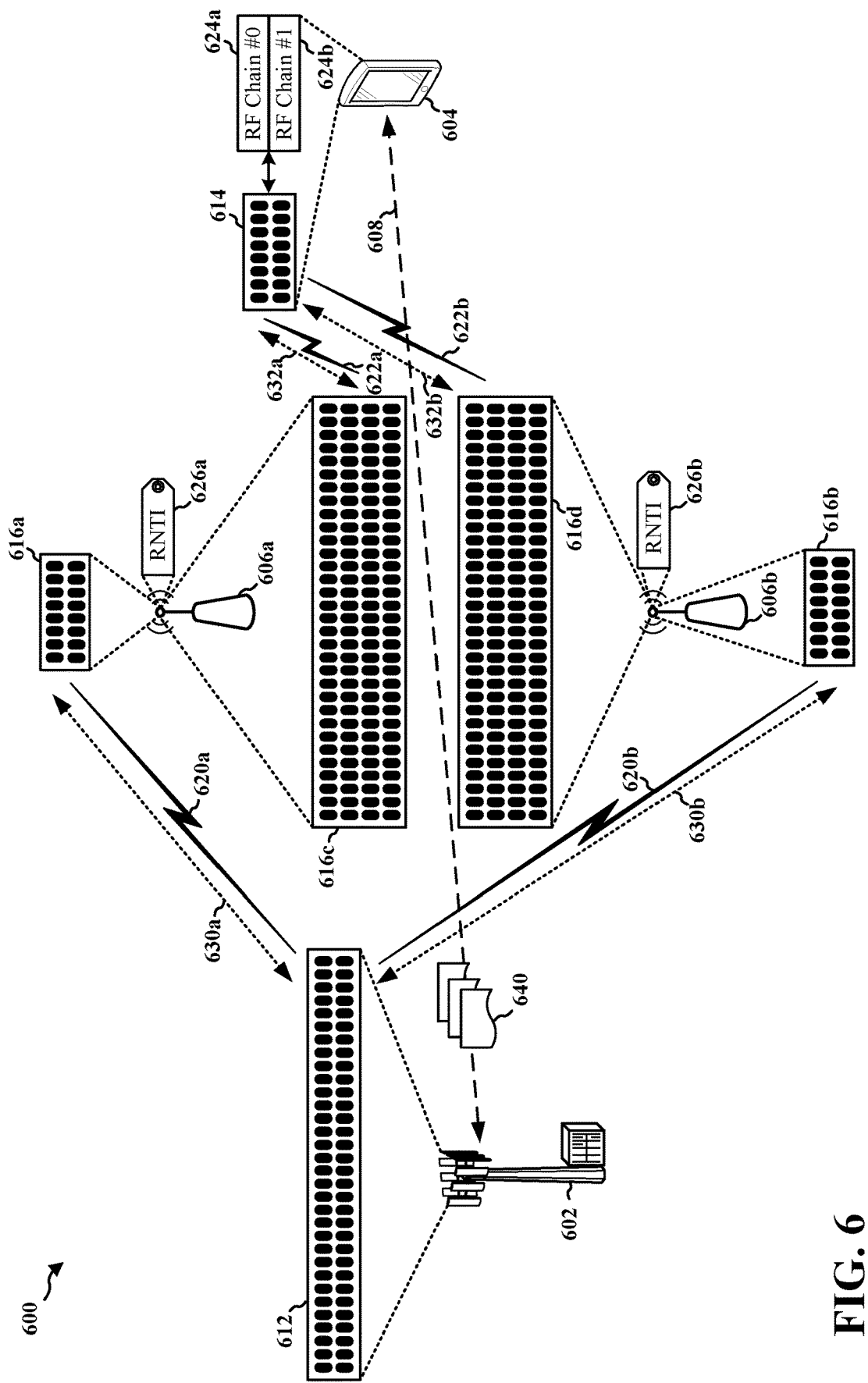
FIG. 6 is a diagram illustrating an example of virtual multiple-input multiple-output (MIMO) using relay devices in a wireless communications system.

Referring next to FIG. 6, a diagram illustrates a wireless communication system 600 in which a UE 604 may communicate with a base station 602 through virtual MIMO using a plurality of relay devices 606*a-b*. The base station 602 may be implemented, for example, as the base station 102/180, the base station 310, the base station 402, and/or the base station 502. The UE 504 may be implemented, for example, as the UE 104, the UE 350, the UE 404, and/or the UE 504. Each of the relay devices 606*a-b* may be implemented as the relay device 506 and/or any device capable of relaying data and/or control information 640 between the base station 602 and the UE 604, such as an RRH, a mobile station, a UE, and/or other fixed or mobile node.

The wireless communications system 600 may include a RAN or other wireless network, such as an LTE RAN, 5G NR RAN, Wi-Fi network, and so forth. At least two frequency bands in the wireless communications system 600 may be configured for wireless communication (e.g., each of the two frequency bands may be respectively assigned to at least one of the RAN and/or other wireless network). A first band of the at least two frequency bands may be different (e.g., relatively lower) than a second band of the at least two frequency bands. For example, the first frequency band may be a sub-6 or sub-7 GHz band, whereas the second frequency band may be a mmW band, a near-mmW band, and/or an unlicensed band (e.g., a sub-6 or sub-7 GHz unlicensed band and/or a mmW unlicensed band).

In the context of a cellular RAN, such as an LTE or 5G NR RAN, FR1 may be implemented as the aforementioned first frequency band and FR2 (or an unlicensed band) may be implemented as the aforementioned second frequency band. In another aspect, the first frequency band may be assigned to one RAT or other wireless communications technology, whereas the second frequency band may be assigned to a different RAT or different wireless communications technology. As illustrative of this other aspect, the first frequency band may be a cellular band (e.g., a sub-6 or sub-7 GHz band of an LTE or 5G NR or other access network), but the second frequency band may be an unlicensed band (e.g., a Wi-Fi band).

Each of the base station 602, the UE 604, and the plurality of relay devices 606*a-b* may be configured for communication in both the first frequency band and the second frequency band, for example, in the RAN or other wireless network. The UE 604 may be configured with at least two RF chains 624*a-b* for each of a set of antenna modules or panels, which may cumulatively include 16 antenna elements 614, thereby enabling communication in both the first and second frequency bands.

Each of the at least two RF chains 624*a-b* may control a respective subset of the antenna elements 614. For example, the at least two RF chains 624*a-b* may each control a respective subset of the antenna elements 614 at one antenna module or panel or, alternatively, each of the at least two RF chains 624*a-b* may control a respective subset of the antenna elements 614 across different antenna modules or panels of the UE 604. As the UE 604 is configured to concurrently control at least two RF chains 624*a-b*, the UE 604 may be configured to simultaneously configure at least two beams for communication. For example, each of the RF chains 624*a-b* may be configured to control a respective subset of the antenna elements 614 to use a respective different beam. The UE 604 may simultaneously communicate at least one stream through each of the different beams using a respective subset of the antenna elements 614 controlled by each of the RF chains 624*a-b*.

Each of the at least two RF chains 624*a-b* may support an independent stream through a respective subset of the antenna elements 614 controlled by a respective one of the RF chains 624*a-b*. In some aspects, the antenna elements 614 of the UE 604 may include dual polarization, and therefore each of the RF chains 624*a-b* may support two layers. The UE 604 may be configured to concurrently control the at least two RF chains 624*a-b*. With concurrent control of two RF chains 624*a-b*, for example, the UE 604 may support four layers: two layers through polarization and two through digital beamforming.

Initially, the base station 602 and the UE 604 may establish a communications link 608 between the base station 602 and the UE 604. In order to establish the communications link 608, the base station 602 and the UE 604 may communicate in the first frequency band on a direct link. While the UE 604 may be capable of communicating in the second frequency band, the base station 602 and the UE 604 may establish the communications link 608 by communicating in the first frequency band, for example, because the UE 604 is too distant for the base station 602 to provide coverage in second frequency band.

According to various aspects, the communications link 608 may be a logical link rather than a physical link. For example, the communications link 608 may include a logical link between a first layer of the UE 604 and a corresponding first layer of the base station 602, with the first layer being relatively higher than a PHY layer in a radio protocol stack (e.g., the first layer may be a MAC layer, an RLC layer, a PDCP layer, and so forth). The base station 602 and the UE 604 do not necessarily need to maintain a direct link in order to maintain the communications link 608.

After the base station 602 and the UE 604 establish the communications link 608, the base station 602 and/or the UE 604 may determine to separate the physical link between the base station 602 and the UE 604, for example, in order to increase the data rate and/or reduce the latency associated with the communications link 608 through virtual MIMO using relay devices 606a-b. For example, the UE 604 may determine that a plurality of relay devices 606a-b is proximate to the UE 604 and capable of relaying data and/or control information 640 on the communications link 608 between the base station 602 and the UE 604, such as by receiving beacons or other signals from each of the plurality of relay devices 606a-b.

Because the UE 604 is configured to concurrently control at least two RF chains 624a-b, and therefore may simultaneously communicate at least two independent streams via at least two different beams, the UE 604 may connect with a plurality of relay devices 606a-b for communication in the second frequency band. Accordingly, the UE 604 may connect with each of the plurality of relay devices 606a-b.

The UE 604 may configure each of the relay devices 606a-b to communicate (e.g., send or receive) at least one respective stream with the UE 604 that carries data and/or control information 640 associated with the communications link 608. In order to separate the at least two relay devices 606a-b, the UE 604 may determine RNTIs 626a-b for the at least two relay devices 606a-b. The UE 604 may assign one of the RNTIs 626a-b to each of the at least two relay devices 606a-b. Each of the RNTIs 626a-b may be associated with the communications link 608 and may identify at least one stream carrying data and/or control information 640 associated with the communications link 608 from a respective one of the at least two relay devices 606a-b. In some aspects, each of the RNTIs 626a-b may be a C-RNTI.

In one aspect, the UE 604 may determine each of the RNTIs 626a-b by transmitting at least one request for at least two RNTIs 626a-b to be respectively assigned to each of the at least two relay devices 606a-b. The base station 602 may receive the at least one request from the UE 604 and, in response, the base station 602 may generate each of the at least two RNTIs 626a-b. The base station 602 may associate each of the at least two RNTIs 626a-b with the UE 604 and/or the communications link 608. The base station 602 may then transmit information indicating each of the at least two RNTIs 626a-b to the UE 604.

The UE 604 may assign each of the at least two RNTIs 626a-b to a respective one of the at least two relay devices 606a-b. In so doing, the UE 604 may transmit a respectively assigned one of the at least two RNTIs 626a-b to each of the at least two relay devices 606a-b. Thus, each of the at least two relay devices 606a-b may be identified through a respectively assigned RNTI of that at least two RNTIs 626a-b, which are associated with the communications link 608.

When the base station 602 and/or the UE 604 communicate data and/or control information 640 on the communications link 608, that data and/or control information 640 may be identified as associated with the communications link 608 based on at least one of the RNTIs 626a-b used for the physical transmission of the data and/or control information 640. In the downlink, for example, the base station 602 may transmit data and/or control information 640 on the communications link 608 by first transmitting the data and/or control information 640 to the at least two relay devices 606a-b having respectively assigned RNTIs 626a-b associated with the communications link 608.

In some aspects, the base station 602 may divide data and/or control information 640 associated with the communications link 608 between each of the at least two relay devices 606a-b, and the base station 602 may transmit a respective portion of the data and/or control information 640 to each of the at least two relay devices 606a-b. The base station 602 may indicate a respectively assigned one of the RNTIs 626a-b in each portion of the data and/or control information 640 transmitted to a respective one of the relay devices 606a-b. For example, the base station 602 may scramble a portion of the data and/or control information 640 with the one of the RNTIs 626a-b respectively assigned to the corresponding one of the relay devices 606a-b. Additionally or alternatively, the base station 602 may scramble other information appended to each portion of the data and/or control information 640, such as a CRC value and/or a MIC value, with a respective one of the RNTIs 626a-b assigned to the one of the at least two relay devices 606a-b to which the portion of the data and/or control information 640 is transmitted.

The base station 602 may transmit at least one of the streams 630a-b carrying each portion of the data and/or control information 640, indicating a respective one of the RNTIs 626a-b, on a respective one of the physical links 620a-b established with a respective one of the at least two relay devices 606a-b. Each of the physical links 620a-b may be in the first frequency band (e.g., in a sub-6 or sub-7 GHz band, in FR1, etc.). In some aspects, each of the physical links 620a-b may include a backhaul link between the base station 602 and a respective one of the at least two relay devices 606a-b.

The base station 602 may transmit the streams 630a-b carrying each portion of the data and/or control information 640, indicating a respective one of the RNTIs 626a-b, on a respective one of the physical links 620a-b using the antenna elements 612 of the base station 602. For example, the base station 602 may be configured with up to 64 antenna elements 612 for communication in the first frequency band (and, therefore, on the physical links 620a-b).

Each of the at least two relay devices 606a-b may receive a respective at least one of the streams 630a-b carrying a respective portion of the data and/or control information 640 associated with the communications link 608 on a respective one of the physical link 620a-b (in the first frequency band). For example, each of the relay devices 606a-b may be configured to use a respective first set of 16 antenna elements 616a-b in the first frequency band (and, therefore, on the physical links 620a-b) to receive at least one stream of the streams 630a-b. In the second frequency band, however, each of the relay devices 606a-b may be configured to use a respective second set of 128 antenna elements 616c-d.

After receiving a respective portion of the data and/or control information 640 associated with the communications link 608 in the first frequency band, each of the at least two relay devices 606a-b may forward the respective portion of the data and/or control information 640 to the UE 604 on a respective one of the physical links 622a-b established between the UE 604 and each of the relay devices 606a-b. Each of the physical links 622a-b between the UE and the relay devices 606a-b may be in the second frequency band (e.g., mmW or near-mmW band, FR2, etc.).

As the UE 604 is configured to concurrently control at least two RF chains 624a-b, the UE 604 may be configured to simultaneously communicate through at least two beams. For example, each of the at least two RF chains 624a-b may control a respective subset of the antenna elements 614, and each of the at least two RF chains 624a-b may generate a respective beam using the respective subset of the antenna elements 614 (e.g., digital beamforming). The UE 604 may simultaneously generate the respective beams, and the UE 604 may control each of the respective beams to point in a different direction (e.g., beamforming).

The UE 604 may associate each of the RF chains 624a-b with a respective one of the relay devices 606a-b. For example, a first RF chain 624a of the UE 604 may generate a first beam that is directed toward communication with the first relay device 606a for the first physical link 622a, whereas a second RF chain 624b of the UE 604 may generate a second beam that is directed toward communication with the second relay device 606b for the second physical link 622b.

In order to communicate with the relay devices 606a-b, the UE 604 may simultaneously direct a respective beam to each of the relay devices 606a-b using a respective one of the RF chains 624a-b. For example, the UE 604 may be configured to use 16 antenna elements 614 in the second frequency band by concurrently controlling each of the at least two RF chains 624a-b to generate a respective beam directed toward a respective one of the relay devices 606a-b.

By way of illustration, assuming the UE 604 is configured to concurrently control two RF chains (e.g., for two streams through digital beamforming), the first RF chain 624a may be associated with the first relay device 606a and, therefore, may generate a first beam that is directed toward the first relay device 606a using a first subset of the antenna elements 614. Similarly, the second RF chain 624b may be associated with the second relay device 606b and, therefore, may generate a second beam that is directed toward the second relay device 606b using a second subset of the antenna elements 614. The first and second subsets of antenna elements 614 may be different antenna modules or panels of the UE 604.

In directing a respective beam toward a respective one of the relay devices 606a-b, each of the RF chains 624a-b may direct the respective beam in a respective direction of the respective one of the relay devices 606a-b. The antenna elements 614, however, may be capable of receiving signals that are reflected off various surfaces, objects, etc., each of which may be known as a "cluster." Therefore, one of the RF chains 624a-b may generate a beam directed to a respective one of the relay devices 606a-b by generating a beam in a direction of a cluster from which signals from the respective one of the relay devices 606a-b are reflected toward the antenna elements 614 controlled by the one of the RF chains 624a-b.

In the downlink, for example, each of the relay devices 606a-b may transmit (e.g., relay) a respectively received portion of the data and/or control information 640 associated with the communications link 608, received from the base station 602 on a respective one of the physical links 620a-b in the first frequency band, to the UE 604 on a respective one of the physical links 622a-b in the second frequency band. When each of the relay devices 606a-b relays a respectively received portion of the data and/or control information 640 associated with the communications link 608, each of the relay devices 606a-b may transmit a respective at least one of the streams 632a-b using a respective one of the second set of antenna elements 616c-d (e.g., 128 antenna elements for communication in the second frequency band). In some aspects, at least one of the relay devices 606a-b may transmit two of the streams 632a-b carrying data and/or control information 640 associated with the communications link 608, such as through antenna polarization. For example, the first relay device 606a may transmit two streams 632a carrying a portion of the data and/or control information 640 associated with the communications link 608, and each of the two streams 632a may indicate the RNTI 626a assigned to the first relay device 606a, which may be associated with the data and/or control information 640.

Each of the relay devices 606a-b may indicate a respectively assigned RNTI in the respective at least one of the streams 632a-b. For example, when transmitting the at least one stream 632a to the UE 604, the at least one stream 632a may indicate the first RNTI 626a because the information 640 and/or other information appended thereto may be scrambled with the first RNTI 626a. In one aspect, the first relay device 606a may scramble a portion of the data and/or control information 640 associated with the communications link 608 with the RNTI 626a assigned the first relay device 606a. In another example, when transmitting the at least one stream 632a to the UE 604, the first relay device 606a may relay the information 640 from the base station 602; the information 640 and/or other information appended thereto (e.g., CRC value and/or MIC value) may be scrambled with the first RNTI 626a. When one of the relay devices 606a-b transmits at least two of the streams 632a-b (e.g., via antenna polarization), each of the at least two of the streams 632a-b may be associated with the same one of the RNTIs 626a-b assigned to that one of the relay devices 606a-b and, therefore, may indicate that same one of the RNTIs 626a-b.

Still referring to downlink as an example, the UE 604 may receive a respective at least one of the streams 632a-b associated with a respectively assigned one of the RNTIs 626a-b from each of the relay devices 606a-b. In some aspects, the UE 604 may concurrently, and potentially simultaneously, receive all of the streams 632a-b transmitted by all of the relay devices 606a-b on the physical links 622a-b using the antenna elements 614 of the UE 604, which may be concurrently controlled by a respective one of the RF chains 624a-b. In the illustrated aspect, for example, the UE 604 may simultaneously receive four streams 632a-b using the 16 antenna elements 614 concurrently controlled by the two RF chains 624a-b.

The number of streams 632a-b carrying data and/or control information 640 associated with the communications link 608 may be at least equal to the number of RF chains 624a-b that the UE 604 is configured to simultaneously control. According to various aspects, the UE 604 may control the RF chains 624a-b for digital beamforming to simultaneously receive a number of independent data streams 632*a-b* that corresponds to the number of relay devices 606*a-b*, with which each of the RF chains 624*a-b* may be associated.

In one aspect, the UE 604 may receive two of the streams 632*a-b* from each of the relay devices 606*a-b*, for example, through polarization of the antenna elements 614 of the UE 604 and the second sets of antenna elements 616*c-d* of the relay devices 660*a-b*. Illustratively, the UE 604 may simultaneously receive four streams 632*a-b* from two relay devices 606*a-b*: two streams via antenna polarization and two streams via digital beamforming.

When the UE 604 receives each of the streams 632*a-b* from each of the relay devices 606*a-b*, the UE may determine the respective one of the RNTIs 626*a-b* assigned to each of the relay devices 606*a-b* respectively transmitting at least one of the streams 632*a-b*. For example, the UE 604 may determine a first RNTI 626*a* associated with at least one stream 632*a* received from the first relay device 606*a* by successfully descrambling the at least one stream 632*a* received from the first relay device 606*a* based on the first RNTI 626*a* respectively assigned to the first relay device 606*a* by the UE 604.

In one aspect, the UE 604 may determine that the at least one stream 632*a* is successfully descrambled using first RNTI 626*a* when the UE 604 is able to successfully recover the portion of the data and/or control information 640 based on descrambling (or decoding) the at least one first stream 632*a* with the first RNTI 626*a*. In another aspect, the UE 604 may determine that the at least one stream 632*a* is successfully descrambled using the first RNTI 626*a* when the UE 604 is able to successfully recover a CRC and/or MIC value through descrambling using the first RNTI 626*a* and, further, the UE 604 determines that the CRC and/or MIC value passes CRC and/or MIC validation, respectively (e.g., the descrambled CRC or MIC value matches an expected CRC or MIC value, respectively).

In some aspects, the UE 604 may blindly decode the information 640 and/or other information appended thereto (e.g., CRC and/or MIC value) based on all of the RNTIs 626*a-b*, and the UE 604 may identify the one of the RNTIs 626*a-b* corresponding to a received one of the streams 632*a-b* based on that one of the RNTIs 626*a-b* used to successfully descramble the information 640 and/or other information appended thereto (e.g., CRC and/or MIC value).

The UE 604 may aggregate each of the streams 632*a-b*, received from the relay devices 606*a-b*, in order to recover the data and/or control information 640. For example, the UE 604 may aggregate each of the streams 632*a-b* at a layer of the UE 604 that is relatively higher than the PHY layer of the UE 604. According to some aspects, the communications link 608 may be a logical connection at a layer of the UE 604 that is relatively higher than the PHY layer, such as the MAC, RLC, or PDCP layer. The UE 604 may aggregate the streams 632*a-b* at the layer of the UE 604 at which the communications link 608 is established. In aggregating the streams 632*a-b*, the data and/or control information 640 may be delivered to a layer of the UE 604 as a single stream. Thus, the distributed architecture in which the UE 604 receives data and/or control information 640 on a communications link 608 established at a higher layer of the UE 604 may be transparent to that higher layer of the UE 604.

In the wireless communications system 600, uplink communication may be similar to the downlink communication described herein. Specifically, the UE 604 may transmit at least one of the streams 632*a-b* carrying data and/or control information 640 associated with the communications link 608 to a respective one of the relay devices 606*a-b* on the physical links 622*a-b* (e.g., in the second frequency band). The UE 604 may indicate the association between each of the streams 632*a-b* and the communications link 608 using each of the RNTIs 626*a-b*. For example, the UE 604 may scramble a portion of the data and/or control information 640 with the one of the RNTIs 626*a-b* respectively assigned to the corresponding one of the relay devices 606*a-b*. Additionally or alternatively, the UE 604 may scramble other information appended to each portion of the data and/or control information 640, such as a CRC value and/or a MIC value, with a respective one of the RNTIs 626*a-b* assigned to the one of the at least two relay devices 606*a-b* to which the portion of the data and/or control information 640 is transmitted.

The relay devices 606*a-b* may relay the data and/or control information 640 to the base station 602 on the physical links 620*a-b*. Specifically, each of the relay devices 606*a-b* may transmit at least one of the streams 630*a-b* to the base station 602 in the first frequency band. Each of the streams 630*a-b* may indicate the RNTI assigned to a respective one of the relay devices 606*a-b*. For example, authentication and/or integrity checks (e.g., CRC and/or MIC values) carried with the data and/or control information 640 on each of the streams 630*a-b* may be scrambled with a corresponding one of the RNTIs 626*a-b*.

The base station 602 may aggregate each of the streams 630*a-b*, received from the relay devices 606*a-b*, in order to recover the data and/or control information 640. For example, the base station 602 may aggregate each of the streams 630*a-b* at a layer of the base station 602 that is relatively higher than the PHY layer of the base station 602. In aggregating the streams 630*a-b*, the data and/or control information 640 may be delivered to a layer of the base station 602 as a single stream.

Figure 7:
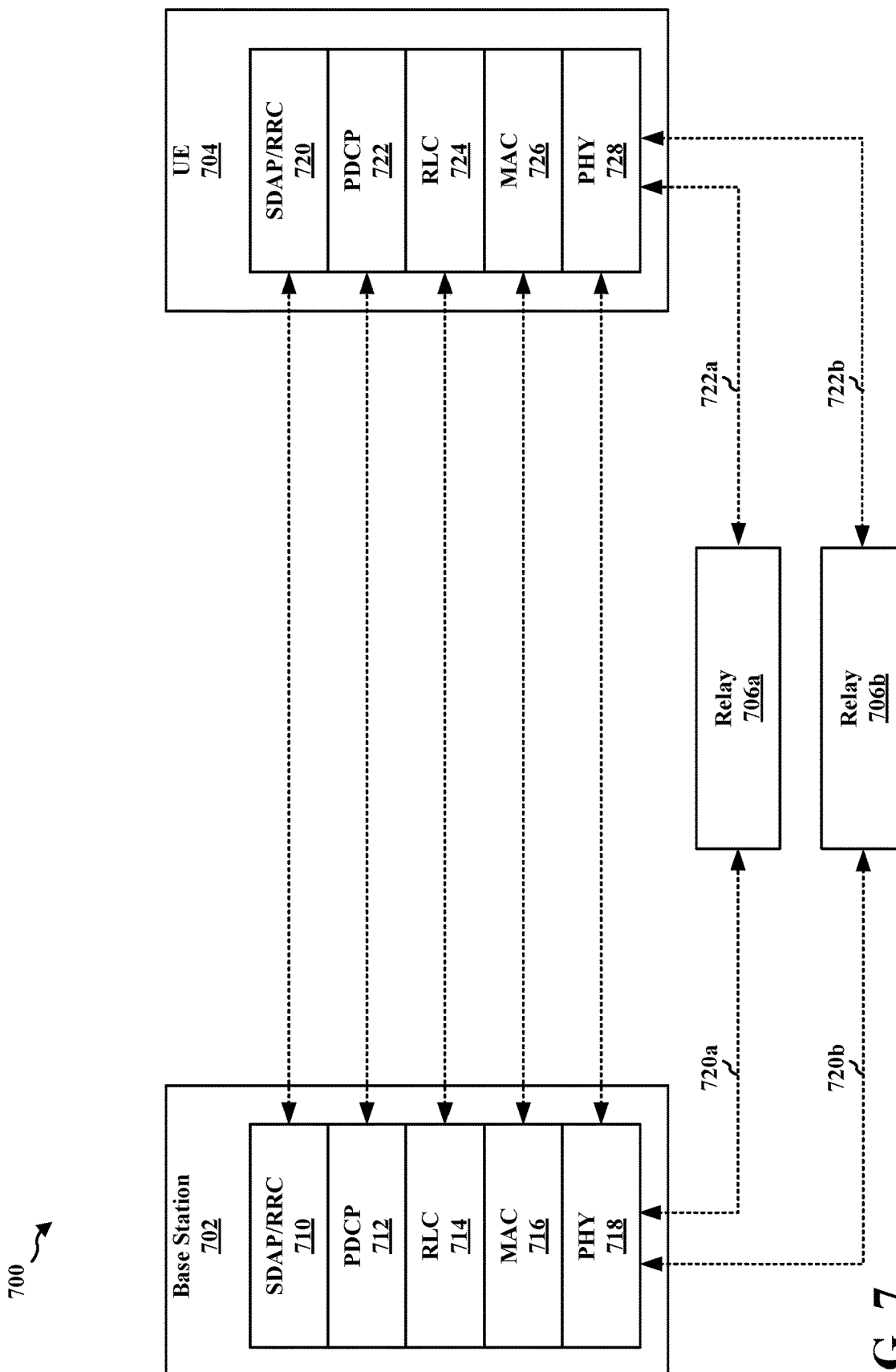
FIG. 7 is a diagram illustrating an example of radio protocol stacks for virtual MIMO using relay devices in a wireless communications system.

With respect to FIG. 7, a diagram illustrates radio protocol stacks 702, 704 for virtual MIMO using relay devices 706*a-b* in a wireless communications system 700. The first radio protocol stack 702 may be configured in a base station, such as the base station 102/180, the base station 310, the base station 402, the base station 502, and/or the base station 602. The second radio protocol stack 704 may be configured in a UE, such as the UE 104, the UE 350, the UE 404, the UE 504, and/or the UE 604. Each of the relay devices 706*a-b* may be implemented as the relay device 506 and/or one of the relay devices 606*a-b*.

Each of the radio protocol stacks 702, 704 may include, inter alia, a service data adaptation protocol (SDAP)/RRC layer 710, 720, a PDCP layer 712, 722, an RLC layer 714, 724, a MAC layer 716, 726, and a PHY layer 718, 728. In the context of FIG. 6, the base station 602 and the UE 604 may establish the communications link 608 between at least one of the corresponding SDAP/RRC layers 710, 720, PDCP layers 712, 722, RLC layers 714, 724, and/or MAC layers 716, 726.

When initially establishing the communications link 608, the base station 602 and the UE 604 may communicate over a direct link, for example, in a sub-6 or sub-7 GHz band and/or in FR1. Thus, the PHY layers 718, 728 may include one connection for the base station-to-UE link.

The communications link 608, however, may be separated at the PHY layers 718, 728. Specifically, the link at the PHY layers 718, 728 may be separated into at least two links 720*a-b*, 722*a-b* through at least two relay devices 706*a-b*. In order to indicate an association between the communications link 608 (e.g., at a higher layer) and the links 720*a-b*, 722*a-b* at the PHY layers 718, 728, each of the RNTIs 626*a-b* may be assigned to a respective one of the relay devices 706*a-b*.

Accordingly, each of the RNTIs 626*a-b* may be associated with a respective one of the PHY layer links 720*a-b* with the base station 602 and the PHY layer links 722*a-b* with the UE 604.

When data and/or control information 640 is transmitted on the communications link 608, the data and/or control information 640 may be provided as a single stream from the MAC layer 716, but the PHY layer 718 of the base station 602 may divide the data and/or control information 640 across the PHY layer links 720*a-b* for transmission to the relay devices 706*a-b*, for example, in a sub-6 or sub-7 GHz, in FR1, via a backhaul link. The relay devices 706*a-b* may then relay the data and/or control information 640 to the UE 604 on the PHY layer links 722*a-b*, for example, in a mmW or near-mmW band, in FR2, etc.

The PHY layer 728 of the UE 604 may determine that each of the PHY layer links 722*a-b* is carrying the data and/or control information 640 associated with one communications link 608 based on the RNTIs indicated by each of the PHY layer links 722*a-b*. Accordingly, the PHY layer 728 may aggregate the data and/or control information 640 received on the PHY layer links 722*a-b* and deliver the data and/or control information 640 as a single stream, such as on the communications link 608.

Figure 8:
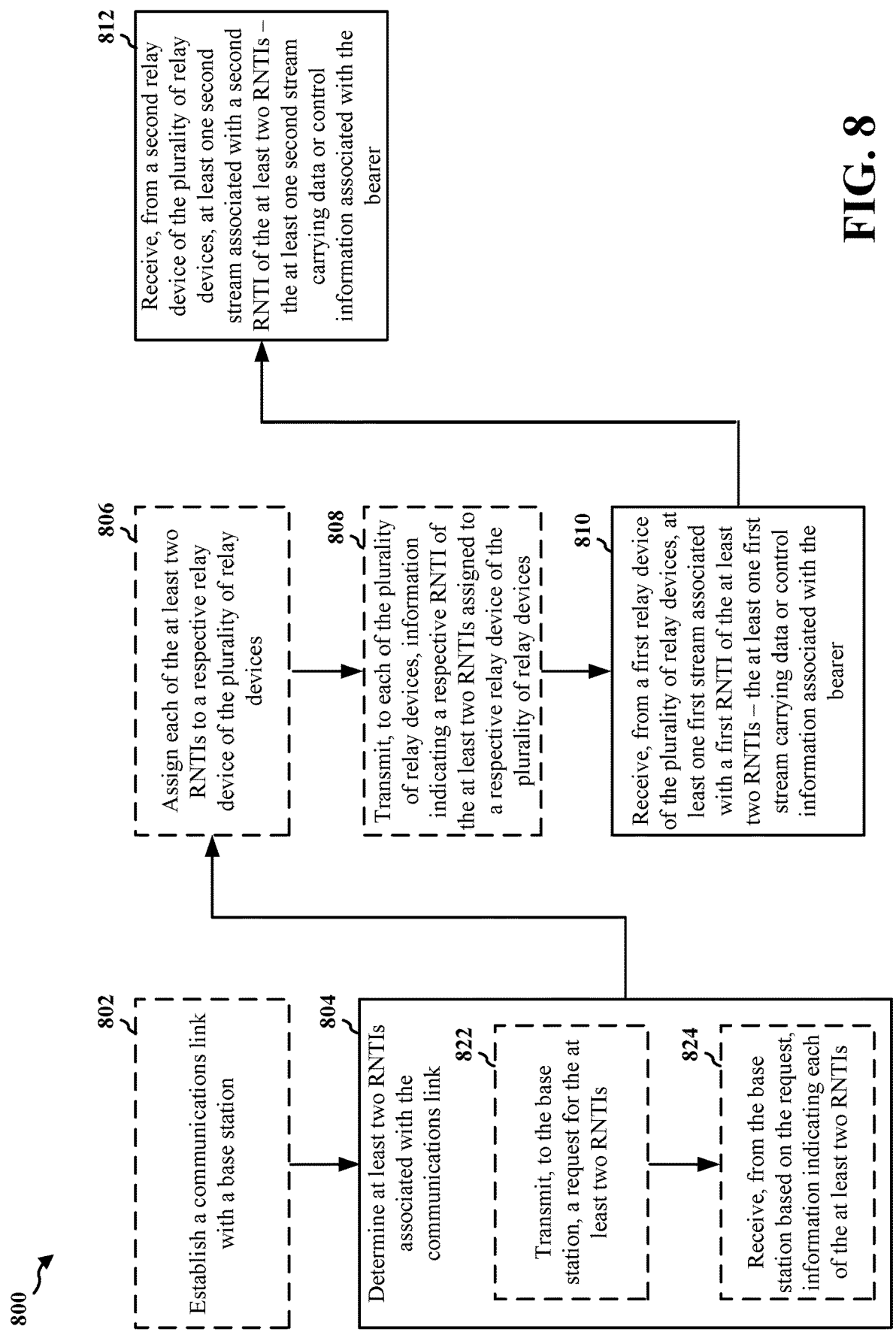
FIG. 8 is a flowchart of a method of virtual MIMO using relay devices for wireless communication by a UE.

FIG. 8 is a flowchart of a method 800 of wireless communication. The method 800 may be performed by a UE (e.g., the UE 104, 350, 404, 504, 604) and/or apparatus (e.g., the apparatus 1002 and/or another apparatus including the memory 360, which may be the entire UE 350 or a component of the UE 350, such as the TX processor 368, the RX processor 356, and/or the controller/processor 359). According to different aspects, one or more of the illustrated operations may be transposed, omitted, and/or contemporaneously performed. For example, one or more operations illustrated with dashed lines may be optionally performed.

At operation 802, the UE may establish a communications link with a base station. The communications link may include at least one logical connection between a first layer of the UE and a first layer of the base station, and each of the first layer of the UE and the first layer of the base station are relatively higher than a PHY layer. In some aspects, for example, the UE may receive system information from the base station, and the UE may acquire synchronization with the base station based on the system information. In some other aspects, for example, the UE may perform a random access channel (RACH) procedure with the base station to establish the communications link, such as by transmitting a preamble message to the base station and then receiving a random access response and/or uplink grant from the base station based on the preamble message. Referring to FIGS. 6 and 7, the UE 604 may establish the communications link 608 with the base station 602. For example, a corresponding pair of the SDAP/RRC layers 710, 720, PDCP layers 712, 722, RLC layers 714, 724, and/or MAC layers 716, 726 of the base station radio protocol stack 702 and the UE radio protocol stack 704 may establish the communications link 608.

At operation 804, the UE may determine at least two RNTIs associated with the communications link. Each of the at least two RNTIs may be a C-RNTI. Referring to FIGS. 6 and 7, the UE 604 may determine the at least two RNTIs 626*a-b* associated with the communications link 608.

In some aspects, operation 804 may include operation 822 and 824. At operation 822, the UE may transmit, to the base station, a request for the at least two RNTIs. Referring to FIGS. 6 and 7, the UE 604 may transmit, to the base station 602, a request for the at least two RNTIs 626*a-b*. At operation 824, the UE may receive, from the base station based on the request, information indicating each of the at least two RNTIs. Referring to FIGS. 6 and 7, the UE 604 may receive, from the base station 602 based on the request, information indicating each of the at least two RNTIs 626*a-b*.

At operation 806, the UE may assign each of the at least two RNTIs to a respective relay device of a plurality of relay devices. For example, first, the UE may identify each relay device to which a respective RNTI is to be assigned and, next, the UE may store respective information indicating an association between each relay device and the respective RNTI assigned thereto. Referring to FIGS. 6 and 7, the UE 604 may assign each of the at least two RNTIs 626*a-b* to a respective one of the at least two relay devices 606*a-b*.

At operation 808, the UE may transmit, to each of the plurality of relay devices, information indicating a respective RNTI of the at least two RNTIs assigned to a respective relay device of the plurality of relay devices. Referring to FIGS. 6 and 7, the UE 604 may transmit, to each of the plurality of relay devices 606*a-b*, each of the at least two RNTIs 626*a-b* assigned to a respective one of the at least two relay devices 606*a-b*.

At operation 810, the UE may receive, from a first relay device of the plurality of relay devices, at least one first stream associated with a first RNTI of the at least two RNTIs. The at least one first stream may carry data and/or control information associated with the communications link. The at least one first stream may be received in a mmW or near-mmW network. Referring to FIGS. 6 and 7, the UE 604 may receive, from a first relay device 606*a*, at least one first stream 632*a* associated with the first RNTI 626*a*.

At operation 812, the UE may receive, from a second relay device of the plurality of relay devices, at least one second stream associated with a second RNTI of the at least two RNTIs. In some aspects, the at least one second stream may be simultaneously received with the at least one first stream. The at least one second stream may carry data and/or control information associated with the communications link. The at least one second stream may be received in a mmW or near-mmW network. Referring to FIGS. 6 and 7, the UE 604 may receive, from a second relay device 606*b*, at least one second stream 632*b* associated with the second RNTI 626*b*.

According to some aspects, the data and/or control information carried on the at least one first stream and the data and/or control information carried on the at least one second stream may be aggregated at a MAC layer of the UE. In one aspect, the at least one first stream may be received via a first RF chain of the UE, and the at least one second stream may be received via a second RF chain of the UE. For example, the first RF chain of the UE may be associated with the first relay device, and the second RF chain of the UE may be associated with the second relay device.

Figure 9:
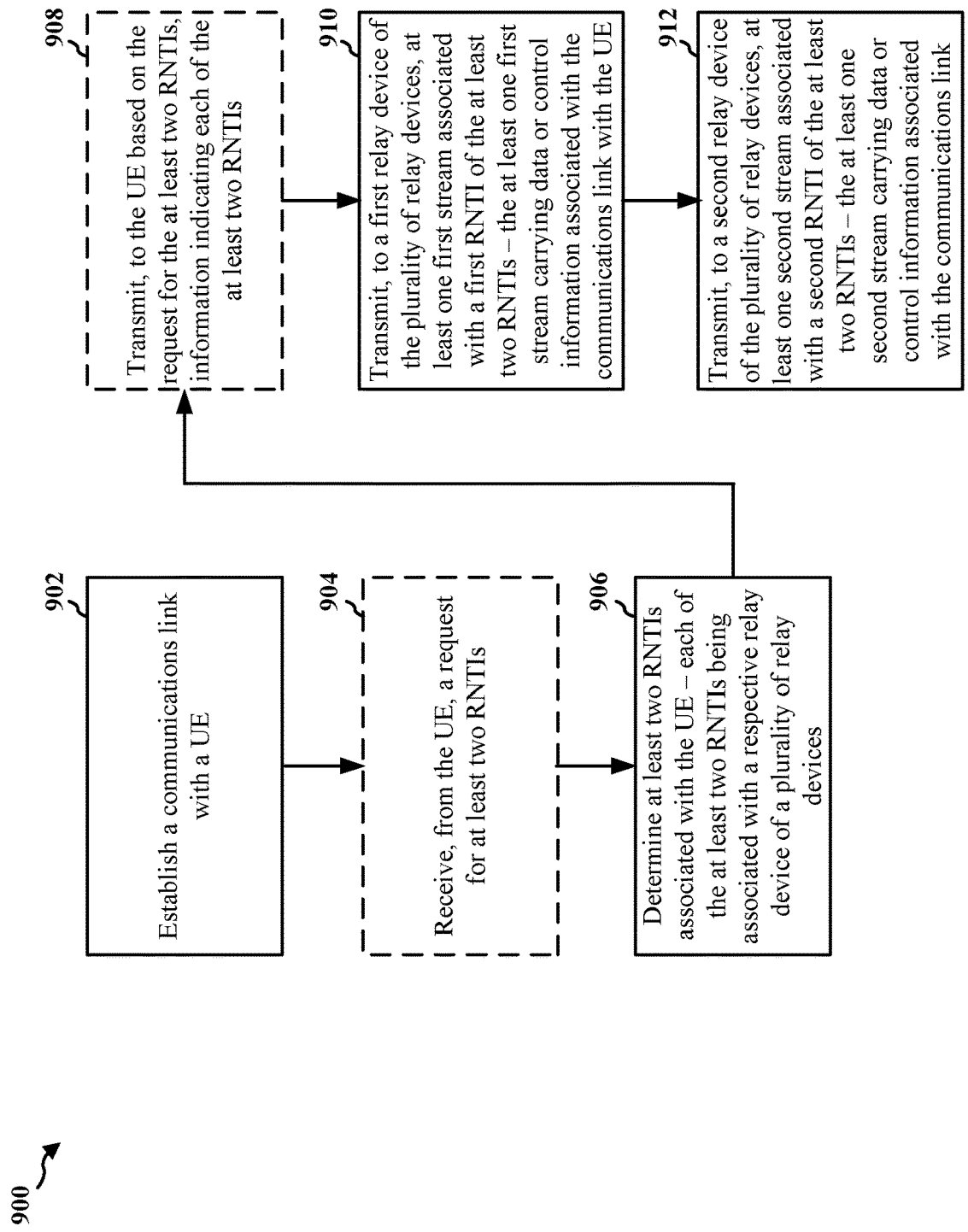
FIG. 9 is a flowchart of a method of virtual MIMO using relay devices for wireless communication by a base station.

FIG. 9 is a flowchart 900 of a method of wireless communication. The method may be performed by a base station (e.g., the base station 102/180, 310, 402, 502, 602) and/or other apparatus (e.g., the apparatus 1102 and/or other apparatus including the memory 376, which may be the entire base station 310 or a component of the base station 310, such as the TX processor 316, the RX processor 370, and/or the controller/processor 375). According to different aspects, one or more of the illustrated operations may be transposed, omitted, and/or contemporaneously performed. For example, one or more operations illustrated with dashed lines may be optionally performed.

At operation 902, the base station may establish a communications link with a UE. The communications link may include at least one logical connection between a first layer of the UE and a first layer of the base station, and each of the first layer of the UE and the first layer of the base station are relatively higher than a PHY layer. In some aspects, for example, the base station may transmit system information associated with synchronizing with the base station and, next, the base station may receive an uplink message from the UE based on the system information. In some other aspects, the base station may perform a RACH procedure with the UE to establish the communications link, such as by receiving a preamble message from then UE and then transmitting a random access response and/or uplink grant to the UE based on the preamble message. Referring to FIGS. 6 and 7, the base station 602 may establish the communications link 608 with the UE 604. For example, a corresponding pair of the SDAP/RRC layers 710, 720, PDCP layers 712, 722, RLC layers 714, 724, and/or MAC layers 716, 726 of the base station radio protocol stack 702 and the UE radio protocol stack 704 may establish the communications link 608.

At operation 904, the base station may receive, from the UE, a request for at least two RNTIs. Referring to FIGS. 6 and 7, the base station 602 may receive, from the UE 604, a request for at least two RNTIs 626a-b.

At operation 906, the base station may determine at least two RNTIs associated with the communications link. Each of the at least two RNTIs may be associated with a respective relay device of a plurality of relay devices. Each of the at least two RNTIs may be a C-RNTI. In some aspects, the base station may determine the at least two RNTIs based on the request received from the UE. For example, first, the base station may determine a set of relay devices capable of providing acting as a respective relay between the base station and the UE and, next, the base station may identify a respective RNTI corresponding to each of the set of relay devices. Referring to FIGS. 6 and 7, the base station 602 may determine the at least two RNTIs 626a-b associated with the communications link 608.

At operation 908, the base station may transmit, to the UE based on the request, information indicating each of the at least two RNTIs. Referring to FIGS. 6 and 7, the base station 602 may transmit, to the UE 604 based on the request, information indicating each of the at least two RNTIs 626a-b.

At operation 910, the base station may transmit, to a first relay device of the plurality of relay devices, at least one first stream associated with a first RNTI of the at least two RNTIs. The at least one first stream may carry data and/or control information associated with the communications link. The at least one first stream may be transmitted in a sub-6 or sub-7 GHz network (e.g., in FR1 of a 5G NR network) and/or via a backhaul link. Referring to FIGS. 6 and 7, the base station 602 may transmit, to a first relay device 606a, at least one first stream 630a associated with the first RNTI 626a.

At operation 912, the base station may transmit, to a second relay device of the plurality of relay devices, at least one second stream associated with a second RNTI of the at least two RNTIs. In some aspects, the at least one second stream may be simultaneously transmitted with the at least one first stream. The at least one second stream may carry data and/or control information associated with the communications link. The at least one second stream may be transmitted in a sub-6 or sub-7 GHz network (e.g., in FR1 of a 5G NR network) and/or via a backhaul link. Referring to FIGS. 6 and 7, the base station 602 may transmit, to a second relay device 606b, at least one second stream 630b associated with the second RNTI 626b.

According to some aspects, the data and/or control information carried on the at least one first stream and the data and/or control information carried on the at least one second stream may be aggregated at a MAC layer of the UE. In one aspect, the at least one first stream may be received via a first RF chain of the UE, and the at least one second stream may be received via a second RF chain of the UE. For example, the first RF chain of the UE may be associated with the first relay device, and the second RF chain of the UE may be associated with the second relay device.

Figure 10:
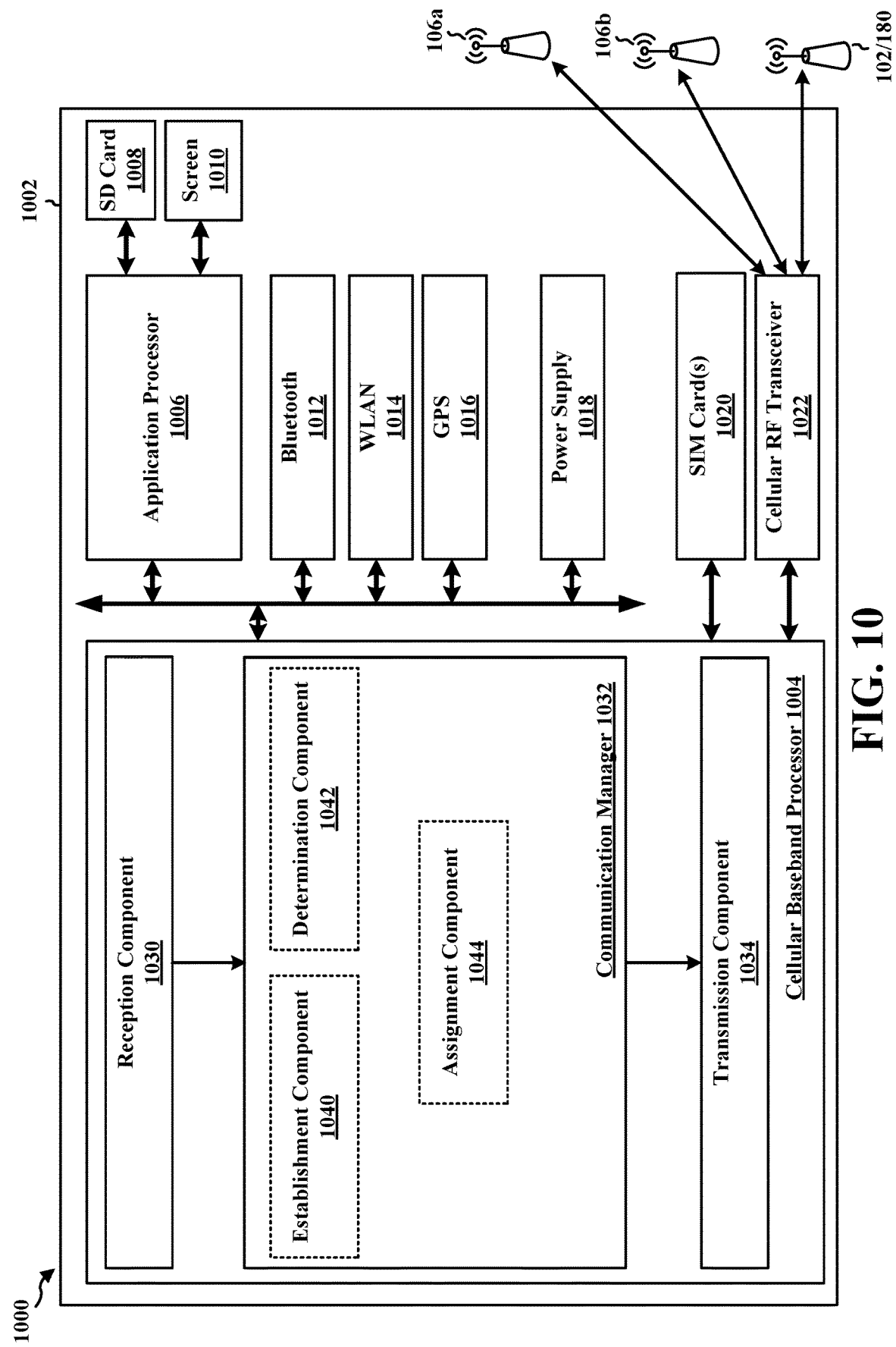
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/ memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/ processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes an establishment component 1040 that is configured to establish a communications link with the base station 102/180, e.g., as described in connection with operation 802 of FIG. 8. The communication manager 1032 further includes a determination component 1042 that receives input(s) based on the communications link from the establishment component 1040 and is configured to determine at least two RNTIs associated with the communications link, e.g., as described in connection with operation 804 of FIG. 8.

In some aspects, the determination component 1042 may be configured to determine the at least two RNTIs associated with the communications link using the transmission component 1034 and the reception component 1030. For example, the transmission component 1034 may be configured to transmit a request for the at least two RNTIs to the base station 102/180, e.g., as described in connection with operation 822 of FIG. 8. Further, the reception component 1030 may be configured to receive information indicating each of the at least two RNTIs from the base station 102/180 based on the transmitted request, e.g., as described in connection with operation 824 of FIG. 8.

The communication manager 1032 further includes an assignment component 1044 that receives input(s) based on the at least two RNTIs from the determination component 1042 and is configured to assign each of the at least two RNTIs to a respective relay device of the plurality of relay devices 106a-b, e.g., as described in connection with operation 806 of FIG. 8.

The assignment component 1044 may provide information indicating the assignment of each of the at least two RNTIs to a respective relay device of the plurality of relay devices 106a-b to the reception component 1030 and/or to the transmission component 1034.

The transmission component 1034 may be further configured to transmit, to each of the plurality of relay devices 106a-b, information indicating a respective RNTI of the at least two RNTIs assigned to a respective relay device of the plurality of relay devices 106a-b, e.g., as described in connection with operation 808 of FIG. 8.

The reception component 1030 may be further configured to receive, from a first relay device 106a of the plurality of relay devices 106a-b, at least one first stream associated with a first RNTI of the at least two RNTIs, e.g., as described in connection with operation 810 of FIG. 8. In some aspects, the at least one first stream may carry data or control information associated with the bearer.

The reception component 1030 may be further configured to receive, from a second relay device 106b of the plurality of relay devices 106a-b, at least one second stream associated with a second RNTI of the at least two RNTIs, e.g., as described in connection with operation 812 of FIG. 8. In some aspects, the at least one second stream may carry data or control information associated with the bearer.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for establishing a communications link with a base station; means for determining at least two RNTIs associated with the communications link, and each of the at least two RNTIs is associated with a respective relay device of a plurality of relay devices; means for receiving, from a first relay device of the plurality of relay devices, at least one first stream associated with a first RNTI of the at least two RNTIs, and the at least one first stream carries data or control information associated with the communications link; and means for receiving, from a second relay device of the plurality of relay devices, at least one second stream associated with a second RNTI of the at least two RNTIs, and the at least one second stream carries data or control information associated with the communications link.

In some aspects, the data or control information carried on the at least one first stream and the data or control information carried on the at least one second stream are aggregated at a MAC layer of the apparatus 1002.

In some aspects, the means for determining at least two RNTIs associated with the communications link is configured to: transmit, to the base station, a request for the at least two RNTIs; and receive, from the base station based on the request, information indicating each of the at least two RNTIs.

In some aspects, the apparatus 1002, and in particular the cellular baseband processor 1004, may include means for assigning each of the at least two RNTIs to the respective relay device of the plurality of relay devices; and means for transmitting, to each of the plurality of relay devices, information indicating a respective RNTI of the at least two RNTIs assigned to a respective relay device of the plurality of relay devices.

In some aspects, the at least one first stream and the at least one second stream are received in a mmW or near-mmW network. In some aspects, the at least one first stream is received via a first RF chain of the apparatus 1002, and the at least one second stream is received via a second RF chain of the apparatus 1002. In some aspects, the first RF chain of the apparatus 1002 is associated with the first relay device, and the second RF chain of the apparatus 1002 is associated with the second relay device. In some aspects, the at least one first stream is simultaneously received with the at least one second stream. In some aspects, each of the at least two RNTIs is a C-RNTI.

In some aspects, the communications link includes at least one logical connection between a first layer of the apparatus 1002 and a first layer of the base station, and the first layer of the apparatus 1002 and the first layer of the base station are relatively higher that a PHY layer in a radio protocol stack.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
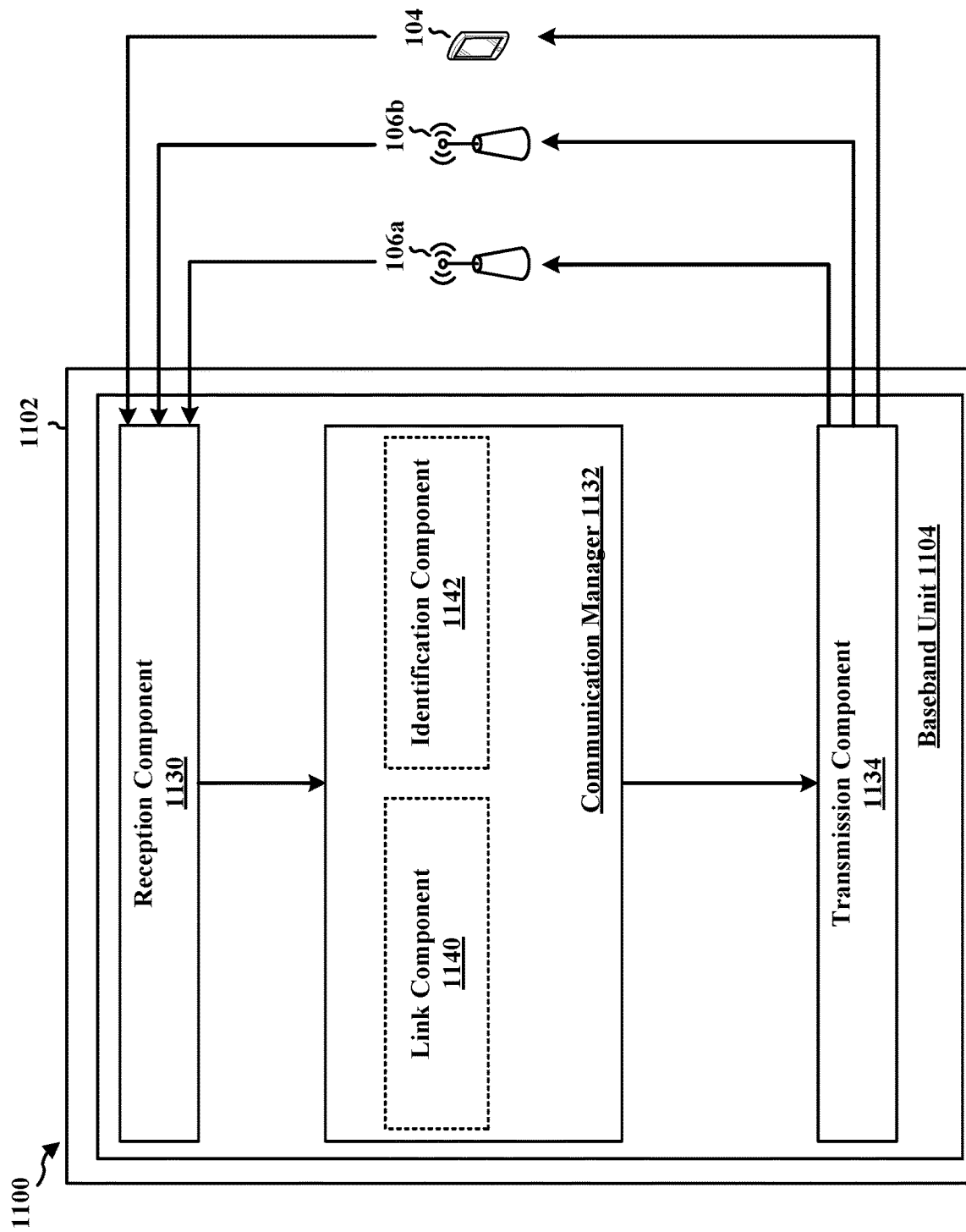
FIG. 11 is a diagram illustrating another example of another hardware implementation for another example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a link component 1140 that is configured to establish a communication link with the UE 104, e.g., as described in connection with operation 902 of FIG. 9.

The reception component 1130 may be configured to receive, from the UE 104, a request for at least two RNTIs, e.g., as described in connection with operation 904 of FIG. 9. The communication manager 1132 further includes an identification component 1142 that receives input(s) based on the request for the at least two RNTIs from the reception component 1130, and is configured to determine at least two RNTIs associated with the UE 104, e.g., as described in connection with operation 906 of FIG. 9. The identification component 1142 may determine the at least two RNTIs based on the request for the at least two RNTIs received from the UE 104. In some aspects, each of the at least two RNTIs is associated with a respective relay device of the plurality of relay devices 106*a-b*.

The transmission component 1134 may receive input(s) based on the request for the at least two RNTIs from the reception component 1130, and may be further configured to transmit, to the UE 104 based on the request for the at least two RNTIs, information indicating each of the at least two RNTIs, e.g., as described in connection with operation 908 of FIG. 9.

The transmission component 1134 may be further configured to transmit, to a first relay device 106*a* of the plurality of relay devices 106*a-b*, at least one first stream associated with a first RNTI of the at least two RNTIs, e.g., as described in connection with operation 910 of FIG. 9. In some aspects, the at least one first stream may carry data or control information associated with the communications link with the UE 104.

The transmission component 1134 may be further configured to transmit, to a second relay device 106*b* of the plurality of relay devices 106*a-b*, at least one second stream associated with a second RNTI of the at least two RNTIs, e.g., as described in connection with operation 912 of FIG. 9. In some aspects, the at least one second stream may also carry data or control information associated with the communications link with the UE 104.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for establishing a communications link with a UE; means for determining at least two RNTIs associated with the UE, and each of the at least two RNTIs is associated with a respective relay device of a plurality of relay devices; means for transmitting, to a first relay device of the plurality of relay devices, at least one first stream associated with a first RNTI of the at least two RNTIs, and the at least one first stream carries data or control information associated with the communications link; and means for transmitting, to a second relay device of the plurality of relay devices, at least one second stream associated with a second RNTI of the at least two RNTIs, and the at least one second stream carries data or control information associated with the communications link.

In some aspects, the apparatus 1102, and in particular the baseband unit 1104 may further include means for receiving, from the UE, a request for the at least two RNTIs, and each of the at least two RNTIs is determined based on the request for the at least two RNTIs; and means for transmitting, to the UE based on the request for the at least two RNTIs, information indicating each of the at least two RNTIs.

In some aspects, the at least one first stream and the at least one second stream are transmitted in a sub-6 or sub-7 GHz network. In some aspects, each of the plurality of relay devices is configured to relay data or control information associated with the communications link established with the UE to the UE in a mmW or near-mmW network. In some aspects, each of the at least two RNTIs may be a C-RNTI. In some aspects, at least one of the plurality of relay devices includes a RRH, a mobile station, a UE, and/or other fixed or mobile node. In some aspects, the communications link includes at least one logical connection between a first layer of the apparatus 1102 and a first layer of the UE, and the first layer of the apparatus 1102 and the first layer of the UE are relatively higher that a PHY layer in a radio protocol stack.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), the method comprising:
   establishing a communications link with a base station;
   receiving, from the base station, information indicating at least two respective radio network temporary identifiers (RNTIs) associated with the communications link;
   transmitting, to each respective relay device of a plurality of relay devices, information indicating a respective RNTI of the at least two RNTIs assigned to a respective relay device of the plurality of relay devices;
   receiving, from a first relay device of the plurality of relay devices, at least one first stream indicating a first RNTI of the at least two RNTIs associated with the communications link established with the base station, wherein each of the at least two RNTIs uniquely identifies a respective relay device of the plurality of relay devices, and wherein the at least one first stream carries data or control information associated with the communications link; and
   receiving, from a second relay device of the plurality of relay devices, at least one second stream indicating a second RNTI of the at least two RNTIs, wherein the at least one second stream carries data or control information associated with the communications link.

2. The method of claim 1, wherein the data or control information carried on the at least one first stream and the data or control information carried on the at least one second stream are aggregated at a media access control (MAC) layer of the UE.

3. The method of claim 1, further comprising:
   transmitting, to the base station, a request for the at least two RNTIs, wherein the information indicating the at least two RNTIs is received based on the request.

4. The method of claim 1, further comprising:
   assigning each of the at least two RNTIs to respective relay devices of the plurality of relay devices.

5. The method of claim 1, wherein the at least one first stream and the at least one second stream are received in at least one of a millimeter wave (mmW) network, a near-mmW network, or an unlicensed network.

6. The method of claim 1, wherein the at least one first stream is received via a first radio frequency (RF) chain of the UE, and the at least one second stream is received via a second RF chain of the UE.

7. The method of claim 6, wherein the first RF chain of the UE is associated with the first relay device, and the second RF chain of the UE is associated with the second relay device.

8. The method of claim 1, wherein the at least one first stream is simultaneously received with the at least one second stream.

9. The method of claim 1, wherein each of the at least two RNTIs comprises a cell RNTI (C-RNTI).

10. The method of claim 1, wherein the communications link comprises at least one logical connection between a first layer of the UE and a first layer of the base station, and wherein the first layer of the UE and the first layer of the base station are relatively higher that a physical (PHY) layer in a radio protocol stack.

11. A method of wireless communication at a base station, the method comprising:
    establishing a communications link with a user equipment (UE);
    transmitting, to a first relay device of a plurality of relay devices, at least one first stream associated with a first radio network temporary identifier (RNTI) of at least two RNTIs associated with the communications link established with the UE at a medium access control (MAC) layer, wherein each of the at least two RNTIs is further associated with a respective relay device of the plurality of relay devices, and wherein the at least one first stream carries data or control information associated with the communications link; and
    transmitting, to a second relay device of the plurality of relay devices, at least one second stream associated with a second RNTI of the at least two RNTIs, wherein the at least one second stream carries data or control information associated with the communications link, and wherein the at least one first stream is transmitted over the communications link via at least one first physical (PHY) layer link with the first relay device and the at least one second stream is transmitted over the communications link via at least one second PHY layer link with the second relay device.

12. The method of claim 11, further comprising:
    receiving, from the UE, a request for the at least two RNTIs; and
    transmitting, to the UE based on the request for the at least two RNTIs, information indicating each of the at least two RNTIs.

13. The method of claim 11, wherein the at least one first stream and the at least one second stream are transmitted in a sub-6 or sub-7 gigahertz (GHz) network.

14. The method of claim 13, wherein each of the plurality of relay devices is configured to relay data or control information associated with the communications link established with the UE to the UE in at least one of a millimeter wave (mmW) network, a near-mmW network, or an unlicensed network.

15. The method of claim 11, wherein each of the at least two RNTIs comprises a cell RNTI (C-RNTI).

16. The method of claim 11, wherein at least one of the plurality of relay devices comprises a remote radio head (RRH) or a user equipment (UE).

17. An apparatus for wireless communication at a user equipment (UE), the apparatus comprising:
    a memory; and
    at least one processor coupled to the memory and configured to:
       establish a communications link with a base station;

receive, from the base station, information indicating at least two respective radio network temporary identifiers (RNTIs) associated with the communications link;

transmit, to each respective relay device of a plurality of relay devices, information indicating a respective RNTI of the at least two RNTIs assigned to a respective relay device of the plurality of relay devices;

receive, from a first relay device of the plurality of relay devices, at least one first stream indicating a first RNTI of the at least two RNTIs associated with the communications link established with the base station, wherein each of the at least two RNTIs uniquely identifies a respective relay device of the plurality of relay devices, and wherein the at least one first stream carries data or control information associated with the communications link; and receive, from a second relay device of the plurality of relay devices, at least one second stream indicating a second RNTI of the at least two RNTIs, wherein the at least one second stream carries data or control information associated with the communications link.

18. The apparatus of claim 17, wherein the data or control information carried on the at least one first stream and the data or control information carried on the at least one second stream are aggregated at a media access control (MAC) layer of the UE.

19. The apparatus of claim 17, wherein the at least one processor is further configured to:
transmit, to the base station, a request for the at least two RNTIs, wherein the information indicating the at least two RNTIs is received based on the request.

20. The apparatus of claim 17, wherein the at least one processor is further configured to:
assign each of the at least two RNTIs to respective relay devices of the plurality of relay devices.

21. The apparatus of claim 17, wherein the at least one first stream and the at least one second stream are received in at least one of a millimeter wave (mmW) network, a near-mmW network, or an unlicensed network.

22. The apparatus of claim 17, wherein the at least one first stream is received via a first radio frequency (RF) chain of the UE, and the at least one second stream is received via a second RF chain of the UE.

23. The apparatus of claim 22, wherein the first RF chain of the UE is associated with the first relay device, and the second RF chain of the UE is associated with the second relay device.

24. The apparatus of claim 17, wherein the at least one first stream is simultaneously received with the at least one second stream.

25. An apparatus for wireless communication at a base station, the apparatus comprising:
a memory; and
at least one processor coupled to the memory and configured to:
establish a communications link with a user equipment (UE);
transmit, to a first relay device of a plurality of relay devices, at least one first stream associated with a first radio network temporary identifier (RNTI) of at least two RNTIs associated with the communications link established with the UE, wherein each of the at least two RNTIs is further associated with a respective relay device of the plurality of relay devices, and wherein the at least one first stream carries data or control information associated with the communications link; and
transmit, to a second relay device of the plurality of relay devices, at least one second stream associated with a second RNTI of the at least two RNTIs, wherein the at least one second stream carries data or control information associated with the communications link, and wherein the at least one first stream is transmitted over the communications link via at least one first physical (PHY) layer link with the first relay device and the at least one second stream is transmitted over the communications link via at least one second PHY layer link with the second relay device.

26. The apparatus of claim 25, wherein the at least one processor is further configured to:
receive, from the UE, a request for the at least two RNTIs; and
transmit, to the UE based on the request for the at least two RNTIs, information indicating each of the at least two RNTIs.

27. The apparatus of claim 25, wherein the at least one first stream and the at least one second stream are transmitted in a sub-6 or sub-7 gigahertz (GHz) network.

28. The apparatus of claim 27, wherein each of the plurality of relay devices is configured to relay data or control information associated with the communications link established with the UE to the UE in at least one of a millimeter wave (mmW) network, a near-mmW network, or an unlicensed network.

29. The apparatus of claim 25, wherein each of the at least two RNTIs comprises a cell RNTI (C-RNTI).

* * * * *